(12) United States Patent
Toku

(10) Patent No.: US 11,301,294 B2
(45) Date of Patent: Apr. 12, 2022

(54) CONTROL DEVICE, CONTROL METHOD, AND CONTROL PROGRAM

(71) Applicant: OMRON Corporation, Kyoto (JP)

(72) Inventor: Takahiro Toku, Kizugawa (JP)

(73) Assignee: OMRON Corporation, Kyoto (JP)

( * ) Notice: Subject to any disclaimer, the term of this patent is extended or adjusted under 35 U.S.C. 154(b) by 398 days.

(21) Appl. No.: 16/495,113

(22) PCT Filed: Apr. 2, 2018

(86) PCT No.: PCT/JP2018/014142
§ 371 (c)(1),
(2) Date: Sep. 18, 2019

(87) PCT Pub. No.: WO2018/186358
PCT Pub. Date: Oct. 11, 2018

(65) Prior Publication Data
US 2020/0019436 A1 Jan. 16, 2020

(30) Foreign Application Priority Data

Apr. 7, 2017 (JP) .............................. JP2017-077015
Mar. 15, 2018 (JP) .............................. JP2018-048152

(51) Int. Cl.
*G06F 9/46* (2006.01)
*G06F 9/48* (2006.01)
(Continued)

(52) U.S. Cl.
CPC ........... *G06F 9/4887* (2013.01); *G05B 19/05* (2013.01); *G06F 9/50* (2013.01); *G05B 2219/15079* (2013.01)

(58) Field of Classification Search
CPC ......... G06F 9/4887; G06F 9/50; G05B 19/05; G05B 2219/15079
See application file for complete search history.

(56) References Cited

U.S. PATENT DOCUMENTS

2011/0077749 A1   3/2011  Shang et al.

FOREIGN PATENT DOCUMENTS

| JP | 2006-004067 A | 1/2006 |
| JP | 2007-519060 A | 7/2007 |
| JP | 2013-506911 A | 2/2013 |

OTHER PUBLICATIONS

English translation of the International Search Report("ISR") of PCT/JP2018/014142 dated Jul. 3, 2018.
(Continued)

*Primary Examiner* — Gregory A Kessler
(74) *Attorney, Agent, or Firm* — Metpolex IP Law Group, PLLC

(57) ABSTRACT

A control device includes a processor that executes a plurality of tasks including a control task and a non-control task that performs related processing related to real-time control, a multitask execution part that causes the processor to execute the tasks in a sequence based on priorities of the respective tasks, and a scheduler. The control task is set to have a highest priority. The scheduler sets the priority of the non-control task to a first priority when an execution start condition of the non-control task has been satisfied, keep the priority of the non-control task at the first priority while the period of time from the execution start is less than or equal to a first time period for executing the related processing in real time, and thereafter reduces the priority to a second priority when the period of time has exceeded the first time period.

20 Claims, 24 Drawing Sheets

(51) Int. Cl.
*G05B 19/05* (2006.01)
*G06F 9/50* (2006.01)

(56) References Cited

OTHER PUBLICATIONS

Written Opinion("WO") of PCT/JP2018/014142 dated Jul. 3, 2018.
Japanese Office Action dated Jun. 26, 2018 in a counterpart Japanese Patent application.

FIG. 8

TASK SETTING

| | TASK TYPE AND PRIORITY | TASK NAME | TRIGGER CYCLE | CYCLE OVER DETECTION |
|---|---|---|---|---|
| | "NON-CONTROL" FIXED CYCLE TASK (PRIORITY 8, 18) | RELATED PROCESSING | 10ms | (2msec, 10msec) |
| | FIXED CYCLE TASK (PRIORITY 17) | LOW PRIORITY CONTROL | 10ms | TO BE DETECTED |
| | FIXED CYCLE TASK (PRIORITY 16) | × × × | 10ms | TO BE DETECTED |
| | PRIMARY FIXED CYCLE TASK (PRIORITY 4) | HIGH PRIORITY CONTROL | 1ms | TO BE DETECTED |

FIG. 12A

| 132: TASK | 133: PRIORITY | 134: PROGRAM NAME |
|---|---|---|
| HIGH PRIORITY CONTROL TASK | 5 | HIGH PRIORITY CONTROL PROGRAM ETC |
| LOW PRIORITY CONTROL TASK | 16 | LOW PRIORITY CONTROL PROGRAM |
| RELATED PROCESSING TASK | 16 | RELATED PROCESSING PROGRAM |
| ⋮ | ⋮ | ⋮ |
| SERVICE TASK | 48 | SYSTEM SERVICE PROGRAM |
| ⋮ | ⋮ | ⋮ |

| 132: TASK | 133: PRIORITY | 134: PROGRAM NAME |
|---|---|---|
| HIGH PRIORITY CONTROL TASK | 5 | HIGH PRIORITY CONTROL PROGRAM ETC |
| LOW PRIORITY CONTROL TASK | 16 | LOW PRIORITY CONTROL PROGRAM |
| RELATED PROCESSING TASK | 17 | RELATED PROCESSING PROGRAM |
| ⋮ | ⋮ | ⋮ |
| SERVICE TASK | 48 | SYSTEM SERVICE PROGRAM |
| ⋮ | ⋮ | ⋮ |

| 132: TASK | 133: PRIORITY | 134: PROGRAM NAME |
|---|---|---|
| HIGH PRIORITY CONTROL TASK | 5 | HIGH PRIORITY CONTROL PROGRAM ETC |
| LOW PRIORITY CONTROL TASK | 16 | LOW PRIORITY CONTROL PROGRAM |
| RELATED PROCESSING TASK | 48 | RELATED PROCESSING PROGRAM |
| ⋮ | ⋮ | ⋮ |
| SERVICE TASK | 48 | SYSTEM SERVICE PROGRAM |
| ⋮ | ⋮ | ⋮ |

| SETTING ITEM | PH: HIGH PRIORITY | | PL: LOW PRIORITY | |
|---|---|---|---|---|
| RTSi | PRIORITY | T1: FIRST TIME PERIOD | PRIORITY | T2: SECOND TIME PERIOD |
| RTS1 | 16 | 2ms | 48 | 10ms |
| RTS2 | 17 | 2ms | 48 | 20ms |

FIG. 15

218 — TASK EXECUTION TIME MONITOR

RTS1

TASK TOTAL EXECUTION TIME    MIN : xx    AVE : yy    MAX : zz

NUMBER OF PRIORITY SWITCHING    MIN : xx    AVE : yy    MAX : zz

NUMBER OF TASK EXECUTION:

HIGH PRIORITY EXECUTION MONITOR    "NUMBER OF PRIORITY SWITCHING: x, NUMBER OF TASK EXECUTION: y"

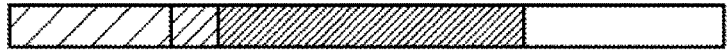

MIN : xx    AVE : yy    MAX : zz

- MIN : SHORTEST TIME OF EXECUTION COMPLETION AT THE CYCLE
- AVE : AVERAGE TIME OF EXECUTION COMPLETION AT THE CYCLE
- MAX : LONGEST TIME OF EXECUTION COMPLETION AT THE CYCLE
- TIME PERIOD (T1) DURING WHICH OPERATED AT HIGH PRIORITY

LOW PRIORITY EXECUTION MONITOR    "NUMBER OF PRIORITY SWITCHING: x, NUMBER OF TASK EXECUTION: y"

MIN : xx    AVE : yy    MAX : zz

- MIN : SHORTEST TIME OF EXECUTION COMPLETION AT THE CYCLE
- AVE : AVERAGE TIME OF EXECUTION COMPLETION AT THE CYCLE
- MAX : LONGEST TIME OF EXECUTION COMPLETION AT THE CYCLE
- TIME PERIOD (T2) DURING WHICH OPERATED AT LOW PRIORITY

FIG. 16A

| TASK | CURRENT PRIORITY | TIME COUNTER UNTIL EXECUTION COMPLETION |
|---|---|---|
| RTS1 | HIGH | 0.2ms |
| RTS1 | LOW | 2ms |

| TASK | NUMBER OF PRIORITY SWITCHING | EXECUTION TIME |
|---|---|---|
| RTS1 | 2 | 12.2 |

| TASK (71) | NUMBER OF EXECUTION (82) | EXECUTION TIME (83) | | NUMBER OF PRIORITY SWITCHING (84) | |
|---|---|---|---|---|---|
| | | MIN | AVE | MAX | MIN | AVE | MAX |
| RTS1 | 21103 | | | | | | |

FIG. 17B

| TASK (71) | HIGH PRIORITY (96) | | TASK EXECUTION TIME (97) | | | LOW PRIORITY (98) | | TASK EXECUTION TIME (99) | | |
|---|---|---|---|---|---|---|---|---|---|---|
| | NUMBER OF SWITCHING | NUMBER OF EXECUTION | MIN | AVE | MAX | NUMBER OF SWITCHING | NUMBER OF EXECUTION | MIN | AVE | MAX |
| RTS1 | 4 | 23 | 0.1ms | 0.8ms | 1.9ms | 5 | 11 | 0.1ms | 0.4ms | 0.5ms |

FIG. 18

| SETTING ITEM (RTSi) | 137 OPERATING CORE DESIGNATION CORE NUMBER | 139 138: ASSIGNMENT MODE DYNAMIC/FIXED | "FIXED CASE" |
|---|---|---|---|
| RTS1 | 2,3 | DYNAMIC | |
| RTS2 | 2,3 | FIXED | HIGH=2, LOW=3 |

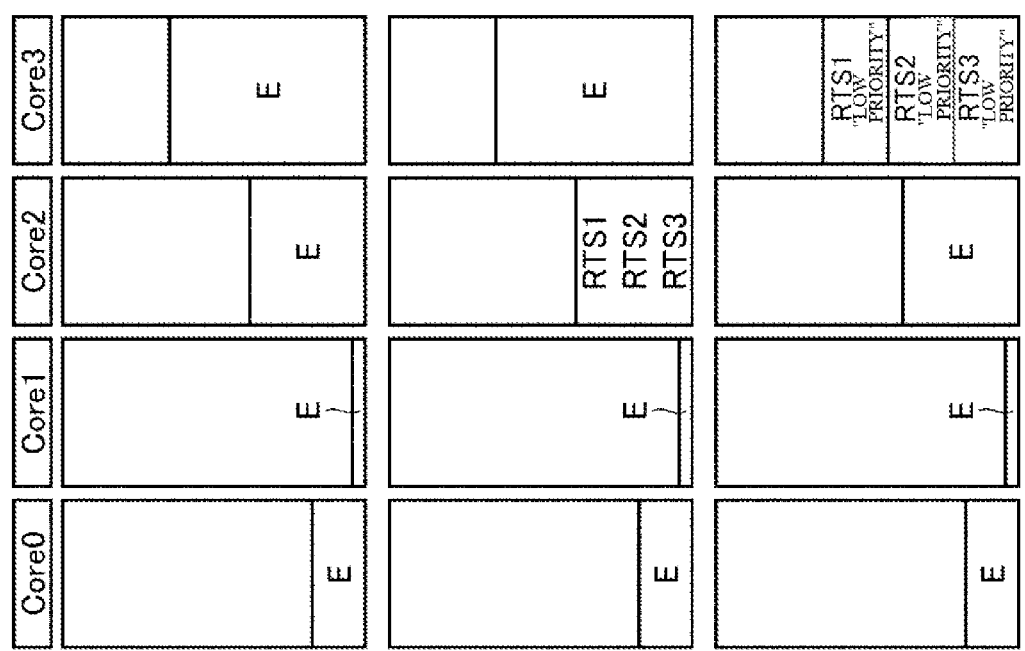
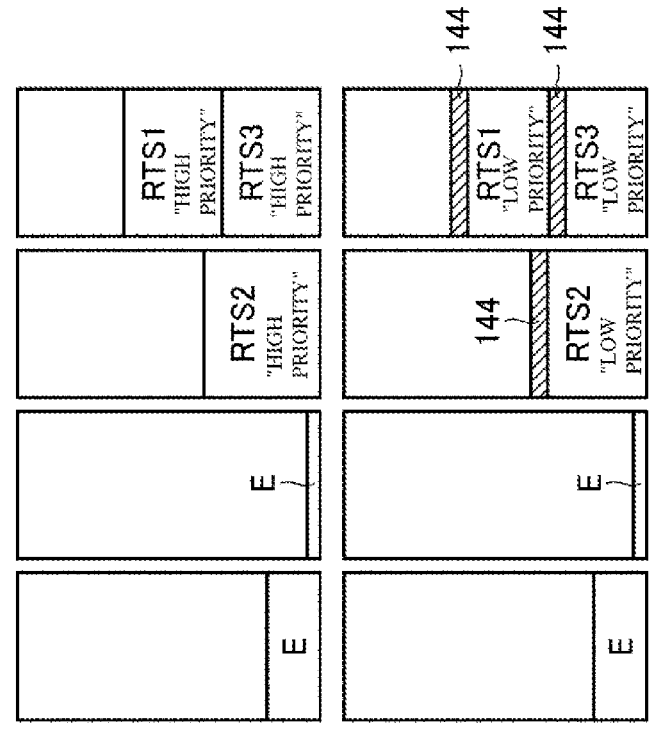

CONTROL DEVICE, CONTROL METHOD, AND CONTROL PROGRAM

TECHNICAL FIELD

The present technology relates to a control device, a control method, and a control program for controlling an object.

RELATED ART

In various production sites, FA (factory automation) technologies using control devices such as PLCs (programmable controllers) are widely used.

High performance is required in control devices such as PLCs. With respect to this requirement, a PLC in Patent Document 1 (JP 2013-506911M includes one or more processors that are assigned to respective PLC functions, and at least two PLC functions are operated in parallel.

RELATED ART DOCUMENT

Patent Document

Patent Document 1: JP 2013-506911A

SUMMARY OF THE INVENTION

Problem to be Solved by the Invention

A control device such as a PLC executes a control task, for controlling apparatuses provided on a production site, that includes a sequence program for realizing sequence control of the apparatuses, a motion program for realizing motion control thereof, at a predetermined cycle, and as a result, real-time control of the apparatuses is realized.

Incidentally, in a control device such as a PLC, there is a demand that, as various functions are added, non-control tasks that are not directly related to control of an apparatus are executed while maintaining the above-mentioned real-time control (periodicity).

In order to satisfy this demand, a method has been proposed in which any non-control task that has not been completed in one cycle is executed in the next cycle. However, this method is not appropriate for specific non-control tasks such as anomaly detection. Specifically, when the processing in real-time control of an object needs to be changed (the machinery is stopped, a workpiece that is defect due to anomaly is removed, a cutter is not brought down after packaging when the machinery to be controlled is a packaging machine, or the like) in accordance with an execution result of the non-control task, there remains a problem, in this method, in that execution of the non-control task cannot be completed in a period of time that is determined considering the relationship with the control task.

In Patent Document 1, at least two of the PLC functions are operated in parallel, but a specific configuration for executing the control task for controlling an object in real time and the non-control task such that real-time control of the object can be ensured is not proposed.

The technology proposed here provides a control device, a control method, and a control program for executing the control task for controlling an object in real time and the non-control task such that real-time control of the object can be ensured.

Means for Solving the Problems

According to an aspect of this disclosure, a control device that controls an object includes: a processor configured to execute a plurality of tasks including a control task for performing real-time control of the object and a non-control task for performing related processing related to the real-time control; a multitask execution part configured to cause the processor to execute the plurality of tasks in a sequence based on priorities associated with respective tasks of the plurality of tasks; and a scheduler configured to variably set the priority of the non-control task, and the control task is set to have a highest priority. The scheduler includes a priority switching part configured to set the priority of the non-control task to a first priority when an execution start condition of the non-control task has been satisfied, keep the priority of the non-control task to the first priority while the period of time from the execution start of the non-control task is less than or equal to a first time period for executing the related processing in real time, and thereafter reduce the priority of the non-control task to a second priority when the period of time from the execution start has exceeded the first time period.

Preferably, the first time period is variably set.

Preferably, the priority switching part further performs switching such that, when the time period from the execution start of the non-control task having the second priority exceeds a second time period, the priority of the non-control task increases to the first priority.

Preferably, the second time period is variably set.

Preferably, the related processing includes: feature amount generation processing for generating a feature amount that is suitable for detecting an anomaly occurring in the object from data related to the object; anomaly detection processing for detecting the anomaly using a feature amount generated in the feature amount generation processing; and processing for communicating data for the feature amount generation processing or the anomaly detection processing with a device including a storage device.

Preferably, the related processing includes: calculation processing for calculating an estimated control amount of the object using an instruction value that is output from the control device to the object and a predetermined predictive control model; and correction value calculation processing for calculating a correction value based on a control amount calculated in the calculation processing, and the control task includes a control computation task for calculating an instruction value to the object in accordance with the calculated correction value.

Preferably, the related processing includes: calculation processing for calculating an estimated control amount of the object using a control amount, of the object, that is output from the control device to the object, and a predetermined predictive control model; correction value calculation processing for calculating a correction value based on a control amount calculated in the calculation processing, and the control task includes a control computation task for calculating an instruction value to the object in accordance with the calculated correction value.

Preferably, the correction value calculation processing includes processing for calculating the correction value that has been corrected such that the control amount is in a predetermined range.

Preferably, the control device further includes a collection part configured to collect, with respect to the non-control task, information regarding execution of the non-control task including an execution time, and the information collected by the collection part is output to the outside.

Preferably, the information to be collected includes the number of switching of the priority of the non-control task.

Preferably, the contents of the related processing are variably set.

Preferably, the control device further includes a core information storage part for storing core information for designating a processor core that will execute the non-control task, the processor includes a plurality of processor cores, and the scheduler further includes a core switching part configured to determine the processor core that will execute the non-control task based on the core information or usage rates of respective processor cores.

Preferably, the core information includes information for designating a processor core that will execute the non-control task based on the priority of the non-control task.

According to another aspect of this technology, a control method in a control device that controls an object is provided. The control device includes: a processor configured to execute a plurality of tasks including a control task for performing real-time control of the object and a non-control task for performing related processing related to the real-time control; and a multitask execution part configured to cause the processor to execute the plurality of tasks in a sequence based on priorities associated with the respective plurality of tasks, and the control task is set to have a highest priority.

The control method includes: a step of setting the priority of the non-control task to a first priority when an execution start condition of the non-control task has been satisfied, and keeping the priority of the non-control task to the first priority while the period of time from the execution start of the non-control task is less than or equal to a first time period for executing the related processing in real time; and a step of thereafter performing switching such that the priority of the non-control task decreases to a second priority, when the period of time from the execution start has exceeded the first time period.

According to another aspect of this technology, a program for causing a computer to execute the control method described above is provided.

Effects of the Invention

According to the technology proposed here, a control task for controlling an object in real time and a non-control task may be executed such that the real-time control of the object can be ensured.

BRIEF DESCRIPTION OF THE DRAWINGS

FIG. 8 is a diagram illustrating a user interface for setting a priority to a task according to the present embodiment.

FIGS. 12A to 12C are diagrams illustrating switching of the priority of the related processing task 143 in association with FIG. 11.

FIG. 13 is a diagram illustrating an example of setting priorities and threshold values to a plurality of related processing tasks according to the present embodiment.

FIG. 15 is a diagram illustrating an exemplary display of support information for debugging according to the present embodiment.

FIGS. 16A and 16B are diagrams illustrating an example of monitor information 153A and a log 135 according to the present embodiment.

FIGS. 17A and 17B are diagrams illustrating an example of collected information 228 according to the present embodiment.

FIG. 18 is a diagram illustrating a core information 136 according to the present embodiment.

FIGS. 21A and 21B are diagrams illustrating another example of executing the plurality of related processing tasks 143 in multicore scheduling according to the present embodiment.

EMBODIMENTS OF THE INVENTION

Figure 1:
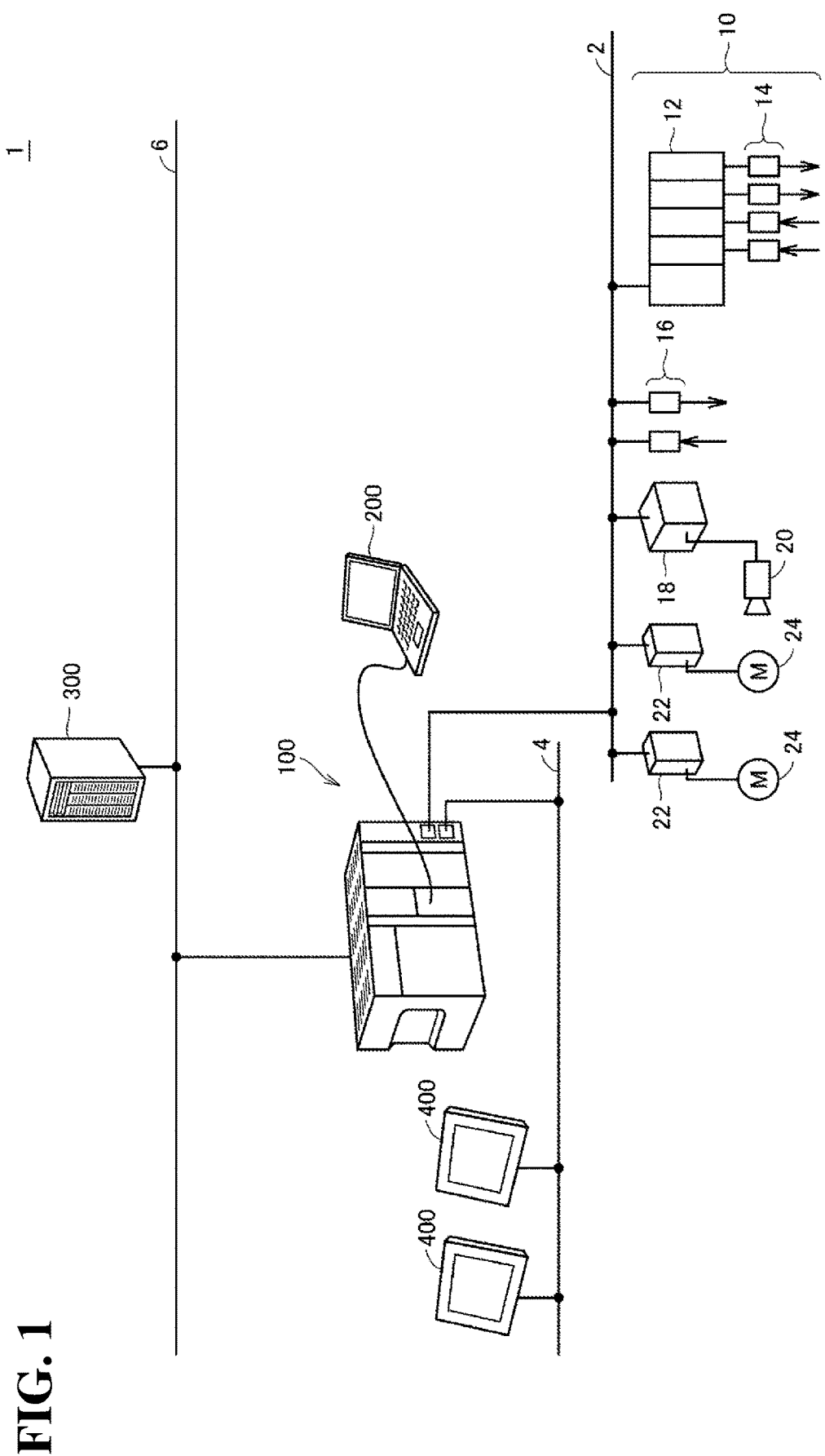
FIG. 1 is a schematic diagram illustrating an exemplary overall configuration of a control system 1 according to an embodiment.

Embodiments of the present invention will be described in detail, with reference to the drawings. Note that the same or equivalent portions in the diagrams are given the same reference numerals and description thereof will not be repeated.

Term Explanation

Terms that are used in the present embodiment will be described.

A "task" is a unit of processing to be executed by a processor, and a task includes at least one program.

A "real-time property" (real-time ability) of a task indicates that the execution of the task will be completed in a predetermined time period after execution of the task is started (i.e. the ability of the task to be carried out in real time).

A "control task" is a task for controlling, in real time, an object, of a field device group, that should be controlled.

A "non-control task" is a task that, different from the "control task", does not directly participate in real-time control, but requires a real-time property, that is, a task for performing processing related to the real-time control.

A "priority" of a task indicates a relative order of execution performed by a processor. A task having a higher priority is executed earlier, and a task having a lower priority is executed later.

Outline of Present Embodiment

In the present embodiment, a scheduler of a control device variably sets priorities of a plurality of tasks including a control task and a non-control task. In the present embodiment, the control task out of a plurality of tasks is set to have a highest priority. If a condition to start execution of the non-control task is satisfied, the scheduler sets the priority of the non-control task at a first priority (high priority), and keeps the priority of the non-control task to the first priority during the first time period, from the start of execution of the non-control task, for executing related processing in real time. Thereafter, when the execution time, which is the time elapsed from the start of execution exceeds the first time period, the scheduler switches the priority of the non-control task such that the priority is decreased to a second priority (low priority).

With this, in a period until the execution time reaches the first time period, the related processing can be executed while maintaining the real-time property, and real-time control of an object using a result of the related processing can be realized, for example. Also, when the execution time exceeds the first time period, the priority of the non-control task is reduced, and another task can be preferentially executed, and therefore when the other task is executing processing that contributes to the real-time control, the object can be controlled in real time using a result of execution of the other task. Therefore, real time execution of the related processing by the non-control task can be realized while ensuring that the object can be controlled by the control task in real-time.

A. Exemplary Overall Configuration of Control System

First, an exemplary overall configuration of a control system 1 including a control device according to the present embodiment will be described.

FIG. 1 is a schematic diagram illustrating an exemplary overall configuration of the control system 1 according to the present embodiment. With reference to FIG. 1, the control system 1 according to the present embodiment includes a control device 100 that controls an object to be controlled, and a support device 200 connected to the control device 100, as main constituent elements.

The control device 100 may be realized as a type of a computer such as a PLC (programmable controller). The control device 100 is connected to a field device group 10 via a first field network 2, and is connected to one or more display devices 400 via a second field network 4. Also, the control device 100 is connected to a data logging device 300 via a local network 6. The control device 100 exchanges data with connected devices via the respective networks. Note that the data logging device 300 and the display device 400 are optional and are not essential constituent elements of the control system 1.

The control device 100 has a function of executing various types of computations for controlling equipment and machinery in a production site or the like, a collecting function of collecting data (hereinafter, also referred to as "input data") that is measured by the field device group 10 and is transferred to the control device 100, and a monitoring function of monitoring the collected input data. As a result of these functions being implemented in the control device 100, phenomena occurring in the object can be monitored.

Specifically, a later-described internal database 130 (hereinafter, also referred to as an "internal DB") that is implemented in the control device 100 provides a portion of the collecting function, and an anomaly detection program (described later) that is implemented in the control device 100 provides the monitoring function.

The field device group 10 includes devices that collect input data from the object to be controlled by the control device 100, and a manufacturing device and a production line that are related to the control performed by the control device 100 (hereinafter, also referred to collectively as a "field"). An input relay and various sensors are envisaged as such devices for collecting input data. The field device group 10 further includes devices that impart some sort of action to the field, based on instructions (hereinafter also referred to as "output data") that are generated by the control device 100. An output relay, a contactor, a servo driver, a servo motor, and other actuators are envisaged as such devices that impart some sort of action to the field. This field device group 10 exchanges data including input data and output data with the control device 100, via the first field network 2.

In the exemplary configuration shown in FIG. 1, the field device group 10 includes a remote I/O (input/output) device 12, a relay group 14, an image sensor 18 and a camera 20, servo drivers 22 and servo motors 24, and an I/O unit 16. The field device group 10 is not limited to these devices, and can adopt any device that can collect input data or a device that can perform an action based on output data.

The remote I/O device 12 includes a communication coupler that communicates via the first field network 2 and an input/output unit (hereinafter, also referred to as "I/O unit") that acquires input data and outputs output data. Input data and output data are exchanged between the control device 100 and the field via such an I/O unit. An example in which digital signals are exchanged as input data and output data via the relay group 14 is shown in FIG. 1. The I/O unit may be directly connected to the field bus. FIG. 1 shows an example in which the I/O unit 16 is directly connected to the first field network 2.

The image sensor 18 performs image measurement processing such as pattern matching on image data captured by the camera 20, and transmits the processing result to the control device 100.

The servo drivers 22 drive the respective servo motors 24 in accordance with output data from the control device 100.

As described above, data is exchanged between the control device 100 and the field device group 10 via the first field network 2, and in the present embodiment, the data to be exchanged is updated every cycle (=unit time) T, for example. The cycle T indicates a predetermined unit time for controlling the field device group 10 in real time, and has a length of an order of several hundreds of μsec to an order of several tens of msec, for example. Note that such update processing of data to be exchanged may also be referred to as "I/O refresh processing".

Also, each display device 400 connected to the control device 100 via the second field network 4 transmits, upon receiving an operation made by a user, a command or the like corresponding to the user operation to the control device 100, and graphically displays a computation result of the control device 100.

The data logging device 300 is connected to the control device 100 via the local network 6, and exchanges required data with the control device 100. The data logging device 300 performs time-series collection of event logs that are generated by the control device 100, and the like.

The support device 200 is a device that supports preparation required in order for the control device 100 to control the object. Specifically, the support device 200 provides the development environment (program creating/editing tool, parser, compiler, etc.) for user programs that are to be executed by the control device 100, the setting environment for setting parameters (configuration) of the control device 100 and various devices connected to the control device 100, a function of transmitting the generated user programs to the control device 100, a later-described debugging tool 227 for performing online (or offline) correction and modification of the user programs or the like that are to be executed on the control device 100.

B. Exemplary Hardware Configuration of Devices

Next, exemplary hardware configurations of the main devices constituting the control system 1 according to the present embodiment will be described.

b1. Exemplary Hardware Configuration of Control Device 100

Figure 2:
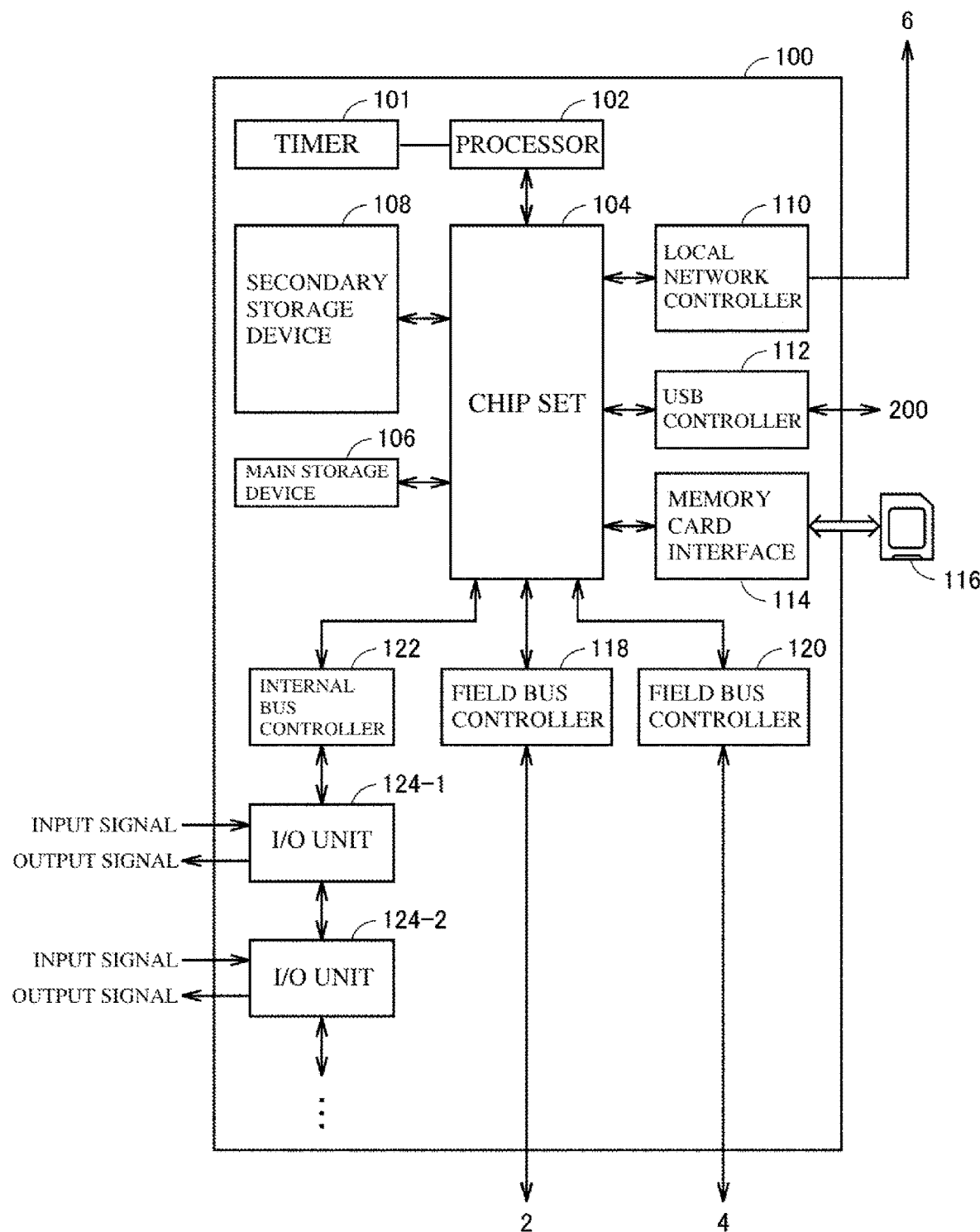
FIG. 2 is a block diagram illustrating an exemplary hardware configuration of a control device 100 that constitutes the control system 1 according to the present embodiment.

FIG. 2 is a block diagram illustrating an exemplary hardware configuration of the control device 100 that constitutes the control system 1 according to the present embodiment. As shown in FIG. 2, the control device 100 includes a timer 101 for measuring various times including the cycle T, a processor 102 such as a CPU (central processing unit) or an MPU (micro-processing unit), a chip set 104, a main storage device 106, a secondary storage device 108, a local network controller 110, a USB (universal serial bus) controller 112, a memory card interface 114, an internal bus controller 122, field bus controllers 118 and 120, and I/O units 124-1, 124-2, and so on. The secondary storage device 108 is constituted by a nonvolatile memory device such as an HDD (hard disk drive) or an SSD (solid state drive), or the like. The main storage device 106 is constituted by a volatile memory device such as a DRAM (dynamic random access memory) or an SRAM (static random access memory) or the like.

The processor 102 realizes control suitable for the object of the field device group 10 and later-described various types of processing by reading out various programs stored in the secondary storage device 108, deploying the programs in the main storage device 106, and executing the deployed programs. The chip set 104 realizes the processing of the control device 100 as a whole, by controlling the processor 102 and respective components.

Various programs such as a user program 150 to be executed by the processor 102 and an internal DB 130 are stored in the secondary storage device 108.

The local network controller 110 controls the exchange of data with other devices performed via the local network 6. The local network controller 110 is typically realized by a dedicated circuit formed by an ASIC (application specific integrated circuit) or an FPGA (field-programmable gate array). The USB controller 112 controls the exchange of data with the support device 200 via an USB connection. The USB controller 112 is typically realized by a dedicated circuit formed by an ASIC or an FPGA.

The memory card interface 114 is configured such that a memory card 116 can be inserted and removed, and is capable of writing data to the memory card 116 and reading out various data (user programs, trace data, and so on) from the memory card 116.

The internal bus controller 122 is an interface that exchanges data with the I/O units 124-1, 124-2, and so on mounted in the control device 100. The internal bus controller 122 is typically realized by a dedicated circuit formed by an ASIC or an FPGA.

The field bus controller 118 controls the exchange of data with other devices performed via the first field network 2. The field bus controller 118 is typically realized by a dedicated circuit formed by an ASIC or an FPGA, but may also be realized by software implementation. When adopting a software implementation, the field bus controller 118 is mainly constituted by the processor 102, the main storage device 106, a storage, and the like, and realizes the required processing by the processor 102 reading out a system program (firmware) or the like stored in the storage, deploying the program in the main storage device 106, and executing the deployed program. Similarly, the field bus controller 120 controls the exchange of data with other devices performed via the second field network 4. The field bus controller 120 is also typically realized by a dedicated circuit formed by an ASIC or an FPGA, but may also be realized by software implementation. When adopting a software implementation, the field bus controller 120 is mainly constituted by the processor 102, the main storage device 106, a storage, and the like, and realizes required processing by the processor 102 reading out a system program (firmware) or the like stored in the storage, deploying the program in the main storage device 106, and executing the deployed program.

Various programs that are to be executed by the control device 100 in FIG. 2 may be installed via a recording medium such as a computer readable memory card 116, but a configuration may also be adopted in which the programs are installed to the secondary storage device 108 by downloading them from a server device on a network, or the like. Also, the functions provided by the control device 100 according to the present embodiment may be realized by utilizing some of the modules provided by a later-described OS (operating system) 190.

Also, an exemplary configuration in which required functions are provided by the processor 102 executing the programs is shown in FIG. 2, but some or all of the functions to be provided may also be implemented using a dedicated hardware circuit (ASIC or FPGA, for example). Alternatively, the principal part of the control device 100 may be realized using hardware that is based on an ordinary architecture (an industrial personal computer based on a general-purpose personal computer, for example). In this case, a configuration may be adopted in which a plurality of OSs having different use applications are executed in parallel using virtualization technology, and required applications are executed on the respective OSs.

b2. Exemplary Hardware Configuration of Support Device 200

Next, the support device 200 according to the present embodiment is realized by executing a program using hardware that is based on an ordinary architecture (a general-purpose personal computer, for example), for example.

Figure 3:
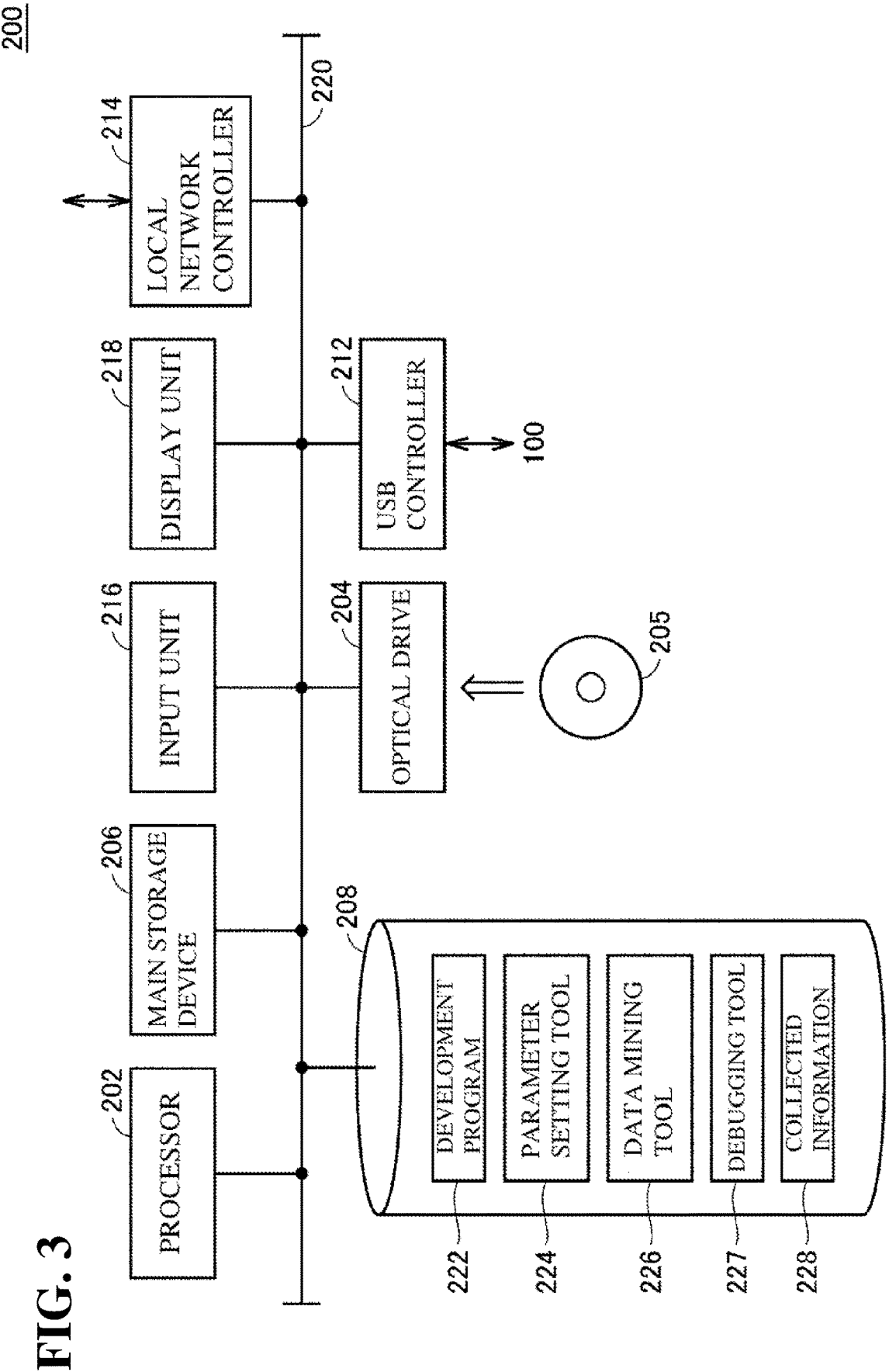
FIG. 3 is a block diagram illustrating an exemplary hardware configuration of a support device 200 that constitutes the control system 1 according to the present embodiment.

FIG. 3 is a block diagram showing an exemplary hardware configuration of the support device 200 constituting the control system 1 according to the present embodiment. As shown in FIG. 3, the support device 200 includes a processor 202 such as a CPU or an MPU, an optical drive 204, a main storage device 206, a secondary storage device 208, a USB (universal serial bus) controller 212, a local network controller 214, an input unit 216, and a display unit 218. These components are connected via a bus 220.

The processor 202 realizes various later-described types of processing by reading out various programs stored in the secondary storage device 208, deploying the programs in the main storage device 206, and executing the deployed programs.

The secondary storage device 208 is constituted by an HDD (hard disk drive) or an SSD (flash solid state drive), for example. The secondary storage device 208 may typically store a development program 222 for creating a user program 150, defining the system configuration, setting various parameters, and the like, a parameter setting tool 224 for designating various variables, a data mining tool 226 for extracting target information from data collected by the control device 100, a debugging tool 227 relating to task scheduling, and collected information 228. The collected information 228 is information that can be used for debugging, and is a collection of information collected when a task is executed in the control device 100. The details of the debugging tool 227 and the collected information 228 will be described later. Also, the OS and other required programs may be stored in the secondary storage device 208.

The support device 200 has an optical drive 204, and programs may be read from a computer-readable recording medium 205 (optical recording medium such as a DVD (digital versatile disc), for example) that stores programs in a non-transient manner, and installed on the secondary storage device 208 or the like.

Various programs that are to be executed by the support device 200 are installed via the computer-readable recording medium 205, but a configuration may also be adopted in which the programs are installed by downloading them from a server device on a network, or the like. There are also cases where the functions that are provided by the support device 200 according to the present embodiment are realized by utilizing some of the modules that are provided by the OS.

The USB controller 212 controls the exchange of data with the control device 100 via USB connection. The local network controller 214 controls the exchange of data with other devices performed via any suitable network.

The input unit 216 is constituted by a keyboard, a mouse, and the like, and accepts user operations. The display unit 218 is constituted by a display, various indicators, a printer, and the like, and outputs processing results from the processor 202, and the like.

FIG. 3 shows an exemplary configuration in which required functions are provided by the processor 202 executing programs, but some or all of these functions that are provided may be implemented using a dedicated hardware circuit (ASIC, FPGA, etc.).

C. Overall Processing and Exemplary Functional Configuration

An outline of the processing performed by the control system 1, and an outline of the functions of the control device 100 will be described next.

c1. Overall Processing

Figure 4:
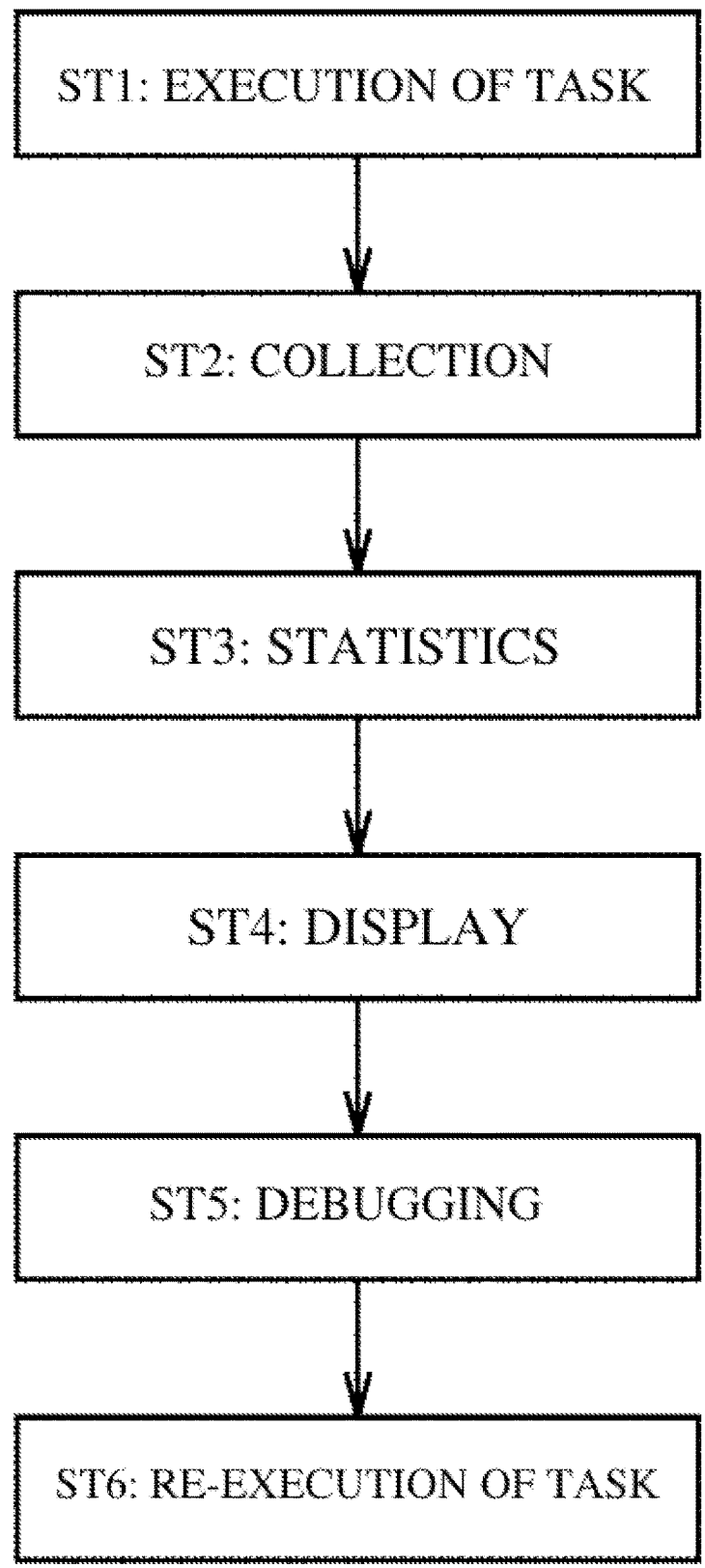
FIG. 4 is a flowchart of an outline of processing according to the present embodiment.

FIG. 4 is a flowchart of an outline of processing according to the present embodiment. As shown in FIG. 4, overall processing performed by the control system 1 includes processing (step ST1) for executing a task performed by the control device 100, and processing (step ST2) for collecting information that is acquired while executing the task. Also, statistical processing (step ST3) of the collected information 228 and display processing (step ST4) based on the collected information 228 that are performed in the support device 200 are included. Moreover, the processing in control system 1 includes debugging processing (step ST5) performed by the debugging tool 227, and processing (step ST6) for again executing a task (program) based on the debugging result in the control device 100.

Note that, in FIG. 4, the support device 200 executes the statistical processing, the processing for displaying an image based on the collected information 228, and the debugging processing (steps ST3 to ST5), but these pieces of processing may also be executed by the control device 100.

c2. Functional Configuration

Figure 5:
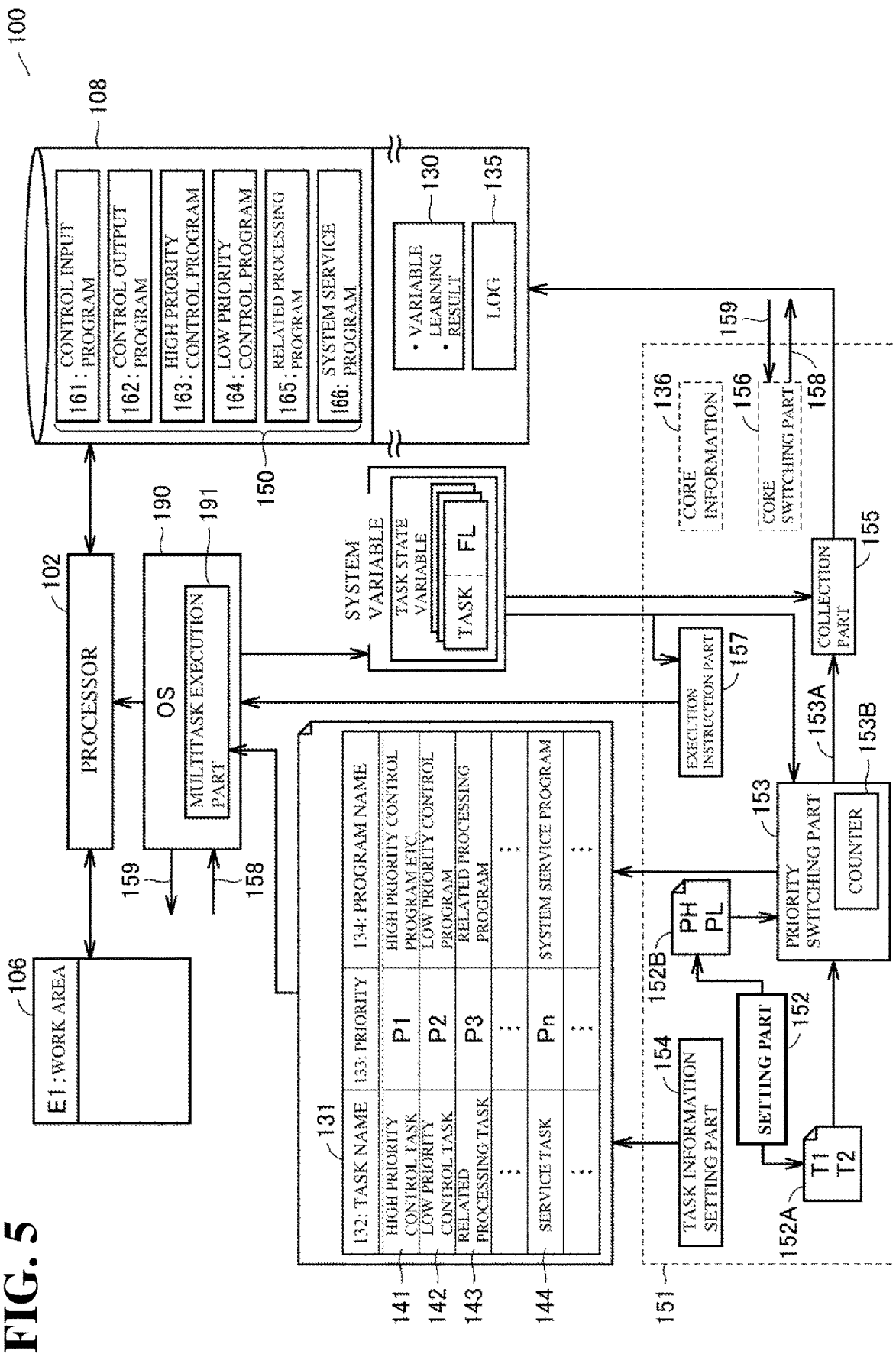
FIG. 5 is a diagram schematically illustrating functions of the control device 100 according to the present embodiment.

FIG. 5 is a diagram schematically illustrating functions of the control device 100 according to the present embodiment. In FIG. 5, a scheduler 151 of the control device 100 is illustrated in association with data stored in the secondary storage device 108.

The main storage device 106 includes a work area E 1 to which the processor 102 deploys a program for execution. Also, the secondary storage device 108 stores the internal DB 130, a log 135 showing information collected when a task is executed, and the user program 150. The user program 150 is a program that a user can create using the support device 200, and is basically executed by the processor 102 (FIG. 2) in the control device 100.

The user program 150 includes primary fixed cycle programs (control input program 161, control output program 162, and high priority control program 163) that are executed at a fixed cycle T in order to control a designated object of the field device group 10 in real time. The user program 150 further includes a low priority control program 164, a related processing program 165, and a system service program 166.

The control input program 161 and the control output program 162 correspond to the functions of I/O refresh processing. Specifically, the control input program 161 and the control output program 162 include commands for writing data (input data and output data) that is exchanged with the field device group 10 to the internal DB 130 as a variable, and for reading out the variable. In the control device 100, each piece of these input data and output data is assigned a unique variable name, and each piece of data exchanged with the field device group 10 can be expressed using its variable name.

The high priority control program 163 typically includes a sequence/motion program (sequence program and/or motion program). The sequence/motion program includes commands for reading out variables in the internal DB 130, performing logical computations and/or numerical computations for controlling an object, of the field device group 10, to be controlled in real time based on the variables, and writing the result to the variables. The variables indicating the computation result obtained by the high priority control program 163 are output to the field device group 10 via the control output program 162, and are used to control the object of the field device group 10.

The low priority control program 164 includes a program that requires a real-time property with respect to the control of the field device group 10, and whose priority is lower than that of the high priority control program. The low priority control program 164 may include a trajectory generation program for generating trajectory data to be provided to the motion program described above, for example.

The related processing program 165 is a program that is for performing processing related to real-time control of an object of the field device group 10, and requires a real-time property, and includes a feature amount generation program and an anomaly detection program, for example.

The feature amount generation program is executed by the processor 102. The feature amount generation program includes commands for generating a feature amount using designated ones of the variables, in accordance with a pre-designated method of creating the feature amount. For example, the feature amount generation program can generate a feature amount suitable for detecting an anomaly that will occur in an object, from data relating to the object of the field device group 10.

The anomaly detection program includes a command for performing anomaly detection processing using the feature amount generated by the feature amount generation program. For example, the anomaly detection program detects whether or not an anomaly is present in an object based on an anomaly detection model set through machine learning and the feature amount generated by the feature amount generation program, and stores the result of detection to the internal DB 130 as a learning result. Also, the learning result may be transmitted to the outside, and output to an external apparatus.

The system service program 166 is executed by the processor 102. The system service program 166 includes a program that does not require the real-time property, and is for performing processing that is different from the processing for controlling the field device group 10. The system service program 166 includes commands for communicating with an apparatus (such as support device 200, data logging device 300, display device 400) external to the control device 100, and writing data to a file. The system service program 166 may include any program that is not cyclically executed and is executed in response to an event such as an interrupt, for example.

An OS 190 is also installed in the control device 100, to provide an environment for the processor 102 to execute programs. The OS 190 includes a multitask execution part 191. The multitask execution part 191 realizes multitask control for causing the processor 102 to execute the user program 150 in units of tasks in a sequence based on the priorities of the respective tasks.

In the present embodiment, the tasks to be executed by the processor includes a high priority control task 141, a low priority control task 142, a related processing task 143, and a service task 144. Note that the types of tasks are not limited thereto. The high priority control task 141 and the low priority control task 142 correspond to the "control tasks" for controlling an object of the field device group 10 in real time. The related processing task 143 corresponds to the "non-control task" that is not directly related to real-time control of the object, but executes processing related to the real-time control. The low priority control task 142 and the service task 144 are tasks that are different from the "control task" and the "non-control task".

In the present embodiment, the control input program 161, the control output program 162, and the high priority control program 163, of the user program 150, are assigned to the high priority control task 141, and the low priority control program 164 is assigned to the low priority control task 142, for example. Also, the related processing program 165 is assigned to the related processing task 143, and the system service program 166 is assigned to the service task 144.

The control device 100 further has task control information 131, system variables, a threshold value 152A, and priority information 152B that the multitask execution part 191 refers to (reads out) for executing a task. These pieces of information are stored in the main storage device 106. Also, the control device 100 has core information 136 used in a later-described multicore operation mode. The details of the core information 136 will be described later.

The system variables includes various variables including a task state variable for controlling execution of a task. The task state variable includes a status flag FL indicating the executing state of the task, in accordance with later-described state transition of the task. The status flag FL has a value written by the multitask execution part 191, and one of "00" (pre-execution state), "01" (executing state and under execution), "10" (executing state and suspended (execution suspended)), and "11" (execution complete state) is written in accordance with state transition of the task, for example. Note that the state transition of a task will be described later in FIG. 6.

The task control information 131 includes, with respect to each task, a task name 132, a priority 133, and a program name 134 of the program assigned to the task. The threshold values 152A include a first time period T1 and a second time period T2 (>first time period T1). The first time period T1 corresponds to a time limit of execution time for executing the related processing program 165 of the related processing task 143 in real time. The priority information 152B includes a high priority PH, which is the priority of the related processing task 143, and a low priority PL (priority lower than the high priority).

The scheduler 151 is realized by a program including a command for variably setting the priorities of tasks, that is, the sequence of the tasks to be executed by the processor 102. The program of the scheduler 151 is stored in the secondary storage device 108. The processor 102 reads out the program of the scheduler 151 from the secondary storage device 108, deploys the read out program in the main storage device 106, and executes the deployed program.

D. State Transition of Tasks

In the present embodiment, the multitask execution part 191 executes a task while causing the task to transition between an executing state, a pre-execution state, and an execution complete state. The executing state indicates a state in which a resource of the processor 102 or the like is assigned to the task, and the task is under execution. The pre-execution state is a state of the task before transitioning to the executing state, and specifically indicates an executable state in which, when a resource is assigned, the execution of the task can be started. The execution complete state is a state in which execution of the task is completed, and indicates a state of waiting for a certain event in order for the task to transition to the executable state.

When the processor 102 has one processor core, the number of tasks that enter the executing state by being assigned a resource of the processor 102 (processor core) by the multitask execution part 191 is one at any point in time. The multitask execution part 191 selects a task that is to be assigned the resource next from the tasks in the pre-execution state, and causes the selected task to transition to the executing state. This selection is performed based on the priorities of the respective tasks.

Returning to FIG. 5, the scheduler 151 includes a priority switching part 153 including a counter 153B, a task information setting part 154 including a command for setting the task control information 131, and an execution instruction part 157 including a command for outputting an execution start instruction for instructing to start execution of the related processing task 143 to the multitask execution part 191. The counter 153B measures the execution time of the related processing task 143 by performing a counting operation in synchronization with the output of the timer 101. Also, the scheduler 151 includes a collection part 155 including a command for collecting information such as the number of times the priority of the related processing task 143 has been switched and an execution time based on monitor information 153A from the priority switching part 153, and a setting part 152 including a command for setting the threshold values 152A and priority information 152B. Also, the scheduler 151 includes a core switching part 156 for activating a later-described multicore operation mode. These parts of the scheduler 151 are realized by programs, and the processor 102 executes these programs.

d1. Priority Switching of Related Processing Task 143

In the present embodiment, the priority switching part 153 of the scheduler 151 performs, with respect to a non-control task, switching (adjustment) of the priority based on the execution time of the task. In the present embodiment, the related processing task 143 is illustrated as the non-control task with respect to which such priority adjustment is performed, but the task is not limited to the related processing task 143.

In the present embodiment, a highest priority is set to the high priority control task 141, which is a "control task". A priority lower than the priority of the high priority control task 141 is set to the low priority control task 142, the "non-control task", and the service task 144. For example, the priority of the related processing task 143 may be set to one of a high priority PH corresponding to a "first priority" or a low priority PL corresponding to a "second priority". The priority switching part 153 includes a command for comparing the execution time of the related processing task 143 measured by the counter 153B with the threshold values 152A, and changing (switching) the priority to one of the high priority PH and the low priority PL based on the comparison result.

Figure 6:
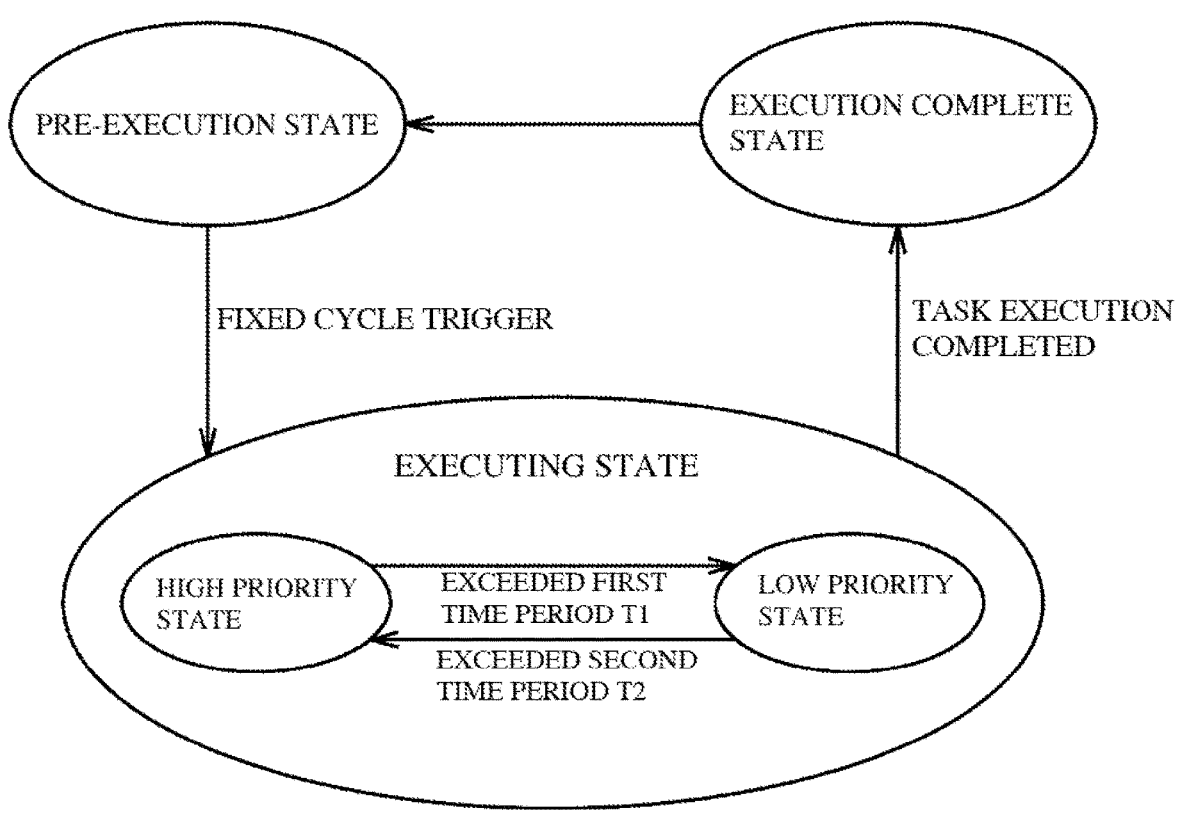
FIG. 6 is a diagram schematically illustrating state transitions of a related processing task 143 according to the present embodiment.

FIG. 6 is a diagram schematically illustrating state transitions of the related processing task 143 according to the present embodiment. As shown in FIG. 6, the multitask execution part 191 can cause the related processing task 143 to transition from the pre-execution state to the executing state in synchronization with a fixed cycle trigger (trigger). The OS 190 outputs the fixed cycle trigger (trigger) in synchronization with the start of a cycle T.

The priority switching part 153 measures the period of time during which the related processing task 143 is in the executing state, that is, the period of time during which the status flag FL associated with the related processing task 143 indicates the executing state (FL="01" or "10") using the counter 153B. If the priority 133 of the related processing task 143 is the "high priority PH", the priority switching part 153 compares the measured execution time with the first time period T1. If the comparison result indicates that the execution time is longer than the first time period T1, the priority switching part 153 rewrites the priority 133 associated with the related processing task 143 in the task control information 131 from the high priority PH to the low priority PL. Also, if the priority 133 of the related processing task 143 indicates the "low priority PL", the priority switching part 153 compares the measured execution time with the second time period T2. If the comparison result indicates that the execution time is longer than the second time period T2, the priority switching part 153 rewrites the priority 133 associated with the related processing task 143 in the task control information 131 from the low priority PL to the high priority PH.

Figure 7:
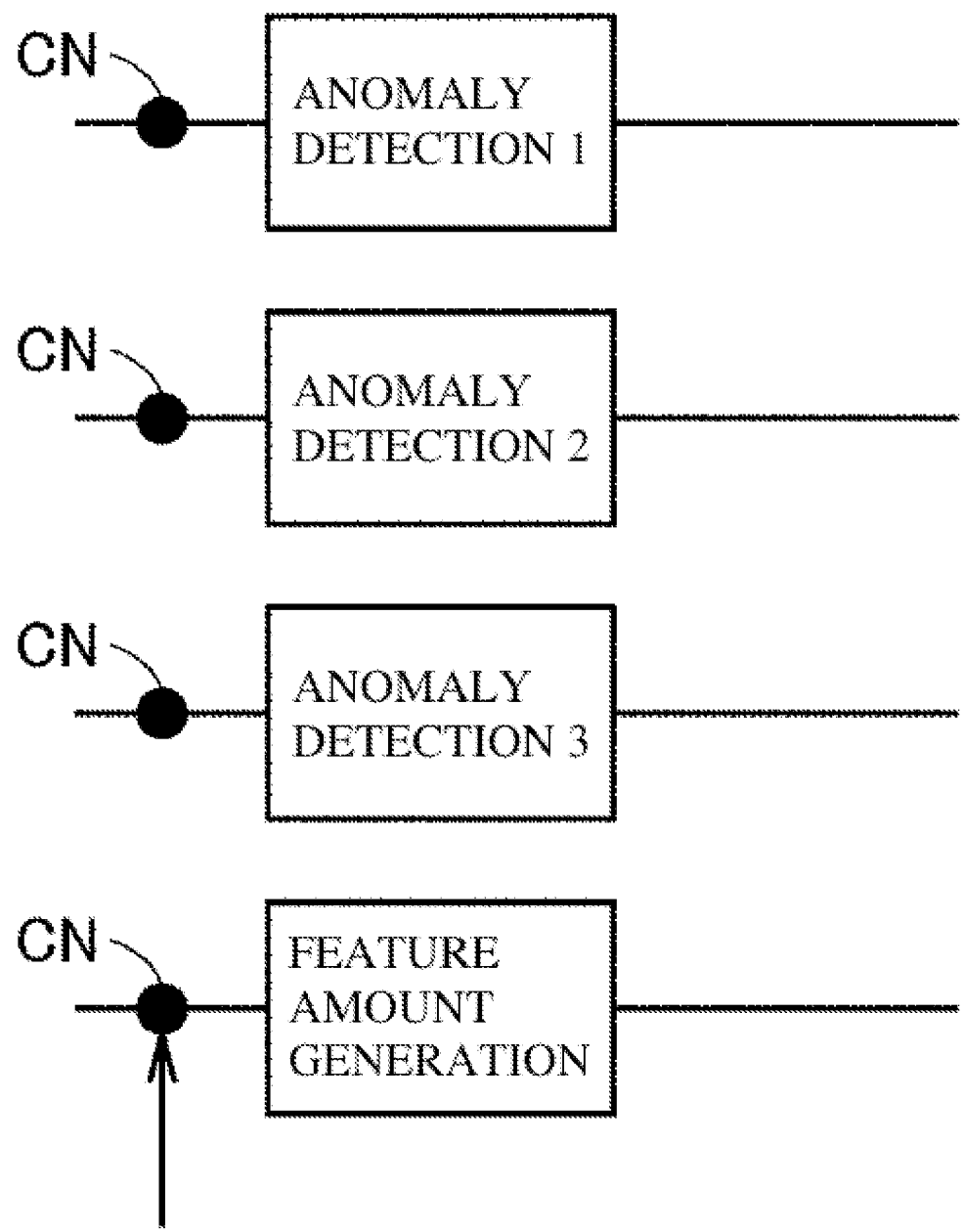
FIG. 7 is a diagram schematically illustrating the configuration of a related processing program 165 according to the present embodiment.

In this way, the priority of the related processing task 143 may be switched based on the period of time (execution time) required to execute the related processing task 143 in the previous executing state.

d2. Instruction for Causing Related Processing Task 143 to Transition to Executing State FIG. 7 is a diagram schematically illustrating the configuration of the related processing program 165 according to the present embodiment. In FIG. 7, anomaly detection programs and a feature amount generation program are illustrated in parallel as the constituent elements of the related processing program 165, and contacts CN are shown in association with respective programs. Each contact CN designates whether or not the associated program is being executed.

The execution instruction part 157, upon determining that the execution start conditions for starting execution of the related processing task 143 are satisfied, outputs an execution start instruction to the multitask execution part 191.

Referring to FIG. 7, the aforementioned execution start conditions will be described. FIG. 7 shows a state in which, when another unshown task is executed, the contact associated with the feature amount generation program is selected by a command instruction output from the other task, for example. Upon receiving the command instruction when receiving a fixed cycle trigger (trigger), the execution instruction part 157 of the scheduler 151 outputs an instruction to start execution of the related processing task 143 to the multitask execution part 191. The multitask execution part 191, upon receiving the instruction to start execution from the execution instruction part 157, causes the related processing task 143 to transition from the pre-execution state to the executing state.

As described above, upon receiving the fixed cycle trigger (trigger) shown in FIG. 6, the command instruction from the control program, an automatic instruction from an event based on a variable value, or an instruction that may include the combination thereof, the execution instruction part 157 determines that the execution start conditions of the related processing task 143 have been satisfied.

d3. Transition of Related Processing Task 143 to Executing State and Setting of Status Flag FL The multitask execution part 191, upon receiving the execution start instruction from the execution instruction part 157, causes the related processing task 143 to transition to the executing state. Specifically, the multitask execution part 191 reads out a program name 134 associated with the related processing task 143 from the task control information 131. The multitask execution part 191 reads out the related processing program 165 from the secondary storage device 108 based on the read-out program name 134, and deploys the read-out related processing program 165 in the main storage device 106, and as a result, execution of the related processing program 165 can be started. With this, the related processing task 143 transitions from the pre-execution state to the executing state.

Also, the multitask execution part 191, upon causing the related processing task 143 to transition from the pre-execution state to the executing state, sets a status flag FL associated with the related processing task 143. Specifically, when the related processing task 143 has transitioned to the executing state, if the processor 102 is not executing another task, the multitask execution part 191 causes the processor 102 to immediately execute the related processing task 143 and changes the status flag FL from "00" to "01".

On the other hand, when the related processing task 143 has transitioned to the executing state, if the processor 102 is executing another task, that is, if another task having the same priority is under execution, the multitask execution part 191 suspends the execution of the related processing task 143, and changes the status flag FL from "00" to "10". In this case, when the execution of the other task is thereafter suspended, the multitask execution part 191 causes the processor 102 to execute the related processing task 143, and changes the status flag FL associated with the related processing task 143 from "10" to "01". In this way, when another task having the same priority as that of the related processing task 143 can transition to the executing state, the two tasks alternatingly enter the executing state by repeating state transition between the under execution state and the execution suspended state (hereinafter, also referred to as "alternating execution") for each predetermined time, and as a result, two tasks can be kept in an executing state.

Thereafter, when the execution of the related processing task 143 is completed, the multitask execution part 191 causes the related processing task 143 to transition from the executing state to the execution complete state, and sets the status flag FL associated with the related processing task 143 to "11".

In this way, with the value of the status flag FL of the related processing task 143, it can be indicated which of the pre-execution state, the executing state (under execution or execution suspended), and the execution complete state the related processing task 143 is in. The counter 153B measures the execution time of the related processing task 143 by measuring the period of time during which the status flag FL of the related processing task 143 is "01" or "10".

E. Setting Information Regarding Task

In the present embodiment, a user can, with respect to each task, set or change the priority and the programs assigned to the task.

Figure 9:
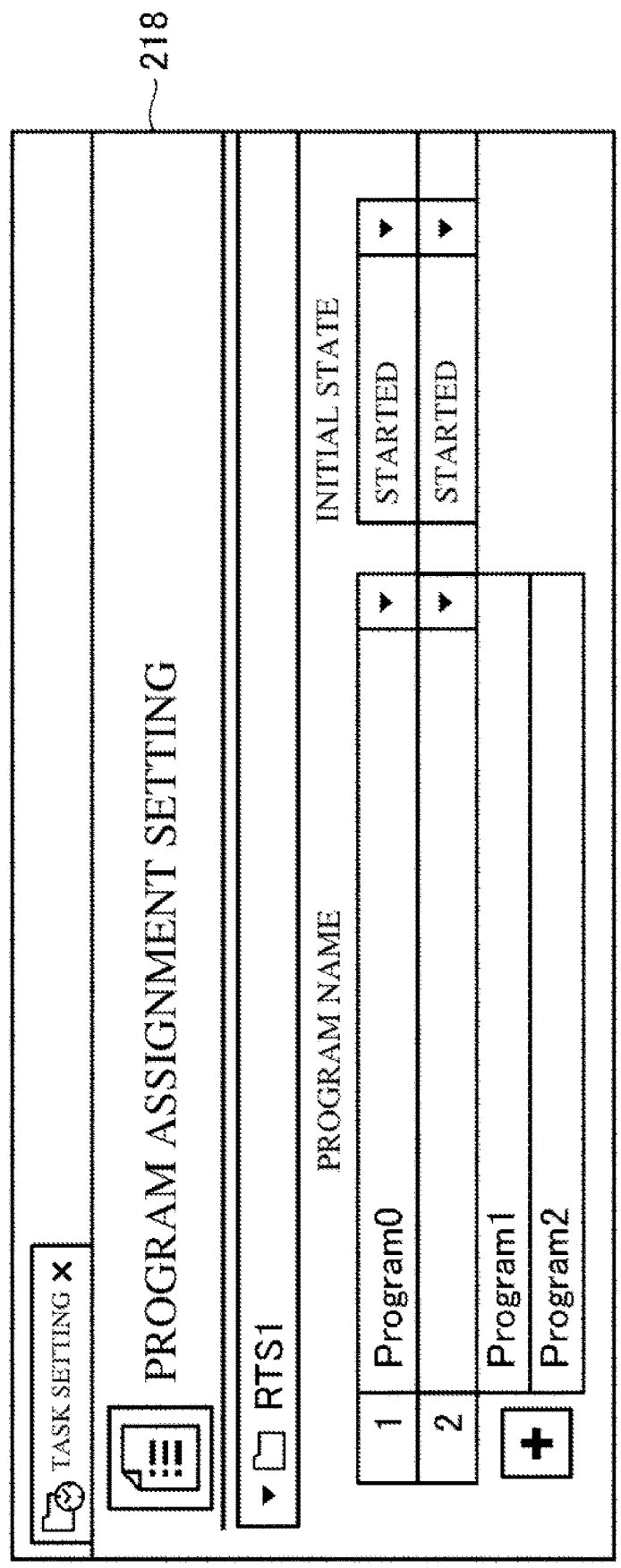
FIG. 9 is a diagram illustrating a user interface for assigning a program to a task according to the present embodiment.

FIG. 8 is a diagram illustrating a user interface for setting a priority to a task according to the present embodiment. FIG. 9 is a diagram illustrating a user interface for assigning a program to a task according to the present embodiment. The user interfaces in FIGS. 8 and 9 are provided as display screens of the display unit 218 of the support device 200.

In the present embodiment, as far as the priorities of tasks are concerned, the high priority control task 141 has the highest priority (earliest in execution sequence) of the tasks of the user program 150, and the priority of the high priority control task 141 is fixed. The priorities of the other tasks of the user program 150 can be variably set so as to be lower than that of the high priority control task 141. The user can set the priorities of the other tasks other than the high priority control task 141 via the user interface in FIG. 8.

In the screen in FIG. 8, with respect to each task, the user can set the items "task type and priority", "task name", "trigger cycle", and "enabling cycle over detection" by operating the input unit 216. Note that, in the present embodiment, with respect to the high priority control task 141, which is a primary fixed cycle task, default values (fixed values) are set such that the task is executed at a cycle of 1 msec with priority "4", as shown in FIG. 8, for example.

The user can set the other tasks other than the "control task" as desired. In FIG. 8, the user sets, with respect to the related processing task 143, "8" as the high priority PH and "18" as the low priority PL, for the priorities, sets "10 msec" as the trigger cycle, and sets, in the column of the cycle over detection, "2 msec" as the first time period T1, and "10 msec" as the second time period T2, for example. Note that the first time period T1 and the second time period T2 are not limited to these values. For example, the user can set the first time period T1 and the second time period T2, in accordance with the real-time property (execution is completed within a predetermined period of time since the execution of the task is started) required for the related processing task 143, as allowable ranges of the predetermined period of time (upper limit value and lower limit value, and the like).

Also, in FIG. 9, the user can set programs to be assigned to the respective tasks. In the present embodiment, one program is basically assigned to a task, but two or more tasks may be assigned to one task. For example, in FIG. 9, programs Program0, Program1, and Program2 (feature amount generation program, anomaly detection program, and the like) that are related are assigned to a task RTS1, which is the related processing task 143.

The support device 200 transfers information set using the user interfaces in FIGS. 8 and 9 to the control device 100. The setting part 152 of the control device 100 sets the values of the high priority PH and the low priority PL that are associated with the related processing task 143, from the information received from the support device 200, to the priority information 152B. Also, the task information setting part 154 sets the task name 132, the priority 133, and the program name 134 that are associated with each task of the task control information 131 based on the information received from the support device 200.

F. Task Management

The control device 100 according to the present embodiment has a single-core operation mode and a multicore operation mode, and manages execution of tasks in each operation mode. Specifically, the processor 102 includes one or more core processors. The single-core operation mode is a mode in which a task is executed using one core processor, and the multicore operation mode is a mode in which a task is executed using two or more core processors. The operation mode of the control device 100 is switchable. First, the single-core operation mode will be described.

Figure 10:
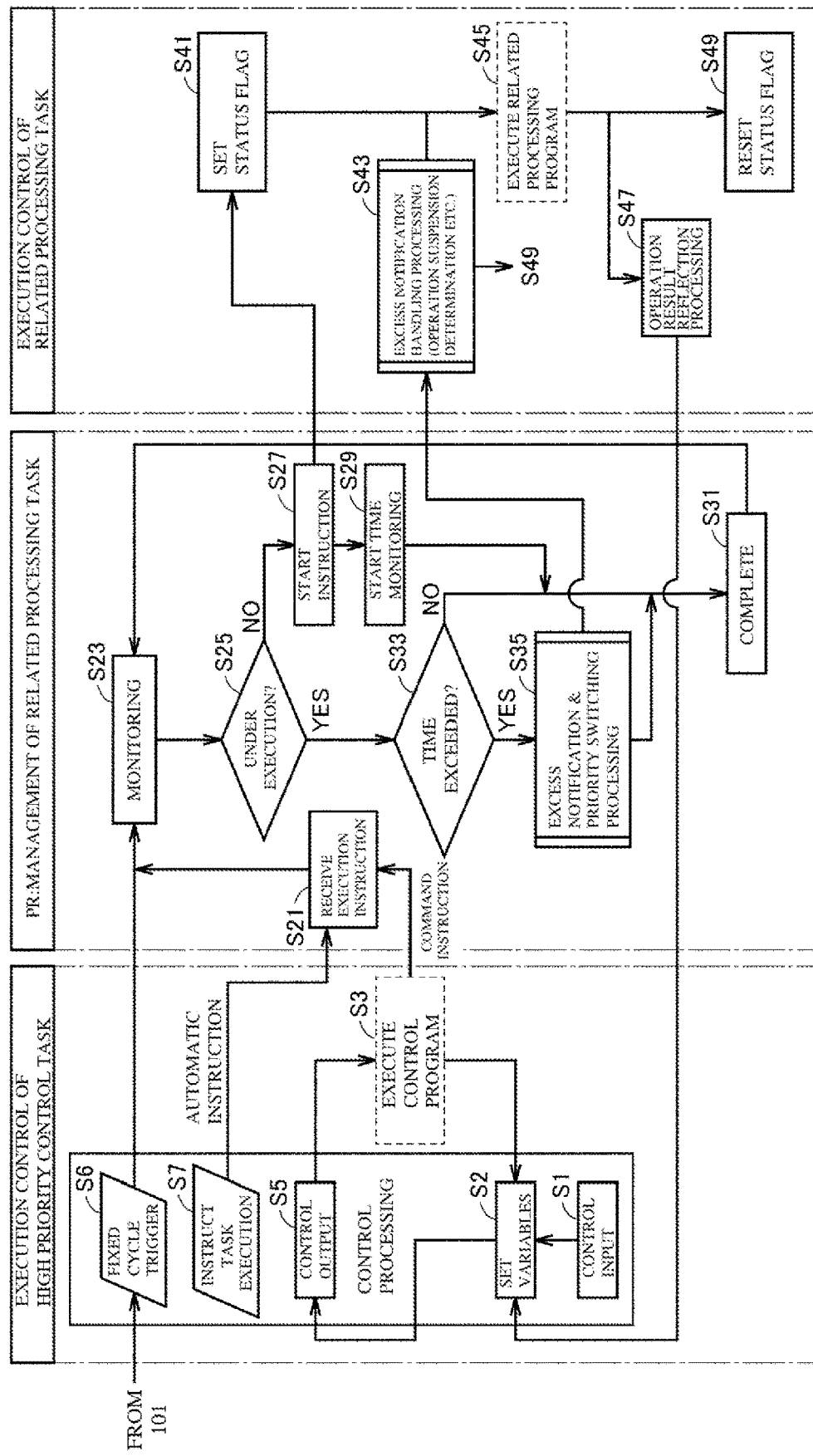
FIG. 10 is a flowchart illustrating processing for managing execution of the related processing task according to the present embodiment.

FIG. 10 is a flowchart illustrating the processing for managing execution of the related processing task according to the present embodiment. In FIG. 10, management processing PR, of the scheduler 151, for managing execution of the related processing task 143 is shown in association with the processing, of the multitask execution part 191, for controlling execution of the high priority control task 141 and the related processing task 143.

The processing, of the multitask execution part 191, for controlling execution of the high priority control task 141 and the related processing task 143 is stored in the main storage device 106 in the form of a program including a portion of the OS 190. Also, the management processing PR of the scheduler 151 is stored in the secondary storage device 108 in the form of a program. The processor 102 reads out these programs from the main storage device 106 and the secondary storage device 108, and executes the programs. Note that, in the present embodiment, the processor 102 periodically executes the program of the management processing PR.

As shown in FIG. 10, when a cycle T is started, the processor 102 executes the high priority control task 141, which has a highest priority 133 of the tasks of the task control information 131. Specifically, the control input program 161 of the high priority control task 141 sets data received from the field device group 10 to an input variable of the internal DB 130 (steps S1 and S2). Also, the high priority control program 163 performs computation based on data of the input variable of the internal DB 130, and writes control data for controlling an object of the field device group 10 to an output variable of the internal DB 130 (steps S3 and S2). The control output program 162 reads out control data indicated by the output variable set in step S2, and outputs the control data for controlling the object (step S5).

f1. Management of Related Processing Task 143 Based on High Priority

When the execution of the high priority control task 141 described above has been completed, the scheduler 151 performs scheduling such that the other tasks are executed in accordance with their priorities. Here, in the task control information 131, a "high priority PH" is set to the priority 133 associated with the related processing task 143 as an initial value, and the "high priority PH" is assumed to be the second highest priority after to the priority of the high priority control task 141.

Note that this initial value is set by the task information setting part 154. Specifically, when the execution instruction part 157 has first determined that the execution start condition of the related processing task 143 is satisfied after the system was initialized (specifically, the control device 100 was initialized), the task information setting part 154 performs the setting of the initial value.

In the management processing PR, when the scheduler 151 has received an execution instruction when receiving an output of a fixed cycle trigger in synchronization with the cycle T (step S6), the execution instruction part 157 determines that the execution start condition has been satisfied (step 21). Upon the execution start condition being satisfied, the scheduler 151 starts managing the state of the related processing task 143 (step S23). The execution instruction includes a command instruction from the processing (step S3) of the high priority control task 141, and an automatic instruction from event processing (step S7) of the high priority control task 141 based on a variable value.

When the management of the state of the related processing task 143 is started, the scheduler 151 determines whether or not the related processing task 143 is in an executing state based on the status flag FL (step S25). At this point in time, the related processing task 143 is not executed, and therefore the status flag FL is "00".

If the scheduler 151 has determined that the related processing task 143 is not in an executing state based on the status flag FL (NO in step S25), the execution instruction part 157 outputs an execution start instruction to the multitask execution part 191 (step S27). When the execution start instruction is output to the multitask execution part 191, the counter 153B starts measuring the execution time of the related processing task 143 (step S29). Thereafter, the scheduler 151 completes the management processing PR (step S31), and returns the processing to step S23.

The multitask execution part 191, upon receiving the execution start instruction from the scheduler 151, selects the related processing task 143 as the task to be executed based on the priority 133 (this priority is the "high priority PH") associated with the related processing task 143 in the task control information 131, and causes the related processing task 143 to transition from the pre-execution state to the executing state. That is, the multitask execution part 191 changes the status flag FL associated with the related processing task 143 from "00" to "01" (step S41). The processor 102 executes the related processing task 143 selected by the scheduler 151. Specifically, the processor 102 executes the related processing program 165 indicated by the program name 134 associated with the related processing task 143 based on the task control information 131 (step S45).

Returning to the management processing PR, if the scheduler 151 has determined that the related processing task 143 is in an executing state (YES in step S25) based on the status flag FL, the priority switching part 153 compares the execution time of the related processing task 143 measured by the counter 153B with the time period of the threshold values 152A (step S33). Specifically, the priority switching part 153 selects the time period to be compared from the first time period T1 and the second time period T2 of the threshold values 152A based on the priority 133 of the related processing task 143. Here, the priority 133 of the related processing task 143 is the high priority PH. Therefore, the priority switching part 153 selects the first time period T1, and compares the execution time of the related processing task 143 with the first time period T1.

If the priority switching part 153 determines, based on the comparison result, that the condition that the execution time is longer than the first time period T1 is satisfied, that is, the execution time has become longer than (exceeded) the first time period (YES in step S33), the priority switching part 153 outputs an excess notification indicating that the execution time has exceeded the first time period T1 to the multitask execution part 191, and performs priority switching processing (step S35). In the priority switching processing, the priority switching part 153 changes the priority 133 of the related processing task 143 in the task control information 131 to the low priority PL of the priority information 152B. Thereafter, the management processing PR is completed (step S31), and the processing is returned to step S23.

Also, if the priority switching part 153 has determined that the aforementioned condition that the execution time is longer than the first time period T1 is not satisfied (NO in step S33), that is, if it has determined that the execution time has not exceeded the first time period T1, completes the processing (step S31), and returns the processing to step S23.

When the execution of the related processing task 143 by the processor 102 has ended, the multitask execution part 191 causes the related processing task 143 to transition from an executing state to an execution complete state. That is, the multitask execution part 191 resets the status flag FL of the related processing task 143 to "11" from "01" (step S49). Also, the related processing task 143 sets the processing result (execution result of the feature amount generation program or the anomaly detection program) to the learning result in the internal DB 130 (steps S47 and S2).

Upon receiving the aforementioned excess notification from the priority switching part 153, the multitask execution part 191 performs excess notification handling processing (step S43), and advances the processing to step S45. In the excess notification handling processing, the multitask execution part 191 performs determination processing for determining whether or not the execution of the related processing task 143 is to be suspended, for example. Note that the processing performed in the excess notification handling processing is not limited to the determination processing.

f2. Management of the Related Processing Task 143 Based on Low Priority

Next, a case will be described in which, when the scheduler 151 has received the next fixed cycle trigger after the processing based on the high priority described above was performed, the priority 133 associated with the related processing task 143 in the task control information 131 is a low priority PL. This is the case in which the priority 133 of the related processing task 143 was changed to the low priority PL by the priority switching part 153 in step S35 described above.

Note that this "low priority PL" is assumed to be the next highest priority after the priority of the high priority control task 141. Also, the priority 133 (low priority PL) of the related processing task 143 is assumed to be the same as the priority 133 of the low priority control task 142.

The scheduler 151, upon receiving the execution instruction of the related processing task 143, determines that the execution start condition is satisfied (steps S21 and S23). Next, the scheduler 151 determines that the related processing task 143 is not in an executing state based on the status flag FL (NO in step S25), and the execution instruction part 157 outputs an execution start instruction to the multitask execution part 191 (step S27). The multitask execution part 191, upon receiving the execution start instruction, causes the processor 102 to execute the related processing task 143. Specifically, the multitask execution part 191 selects the related processing task 143 and the low priority control task 142 in accordance with the priority 133 in the task control information 131, causes these tasks to transition from a pre-execution state to an executing state, and the counter 153B starts measuring the execution time of the related processing task 143 (steps S41, S45, and S29). Thereafter, when the execution of the related processing task 143 is completed, the status flag FL of the related processing task 143 is reset (step S49), and processing of the execution result of the related processing task 143 is performed (step S47).

Here, two tasks (that is, the low priority control task 142 and the related processing task 143) are alternatingly executed, and the counter 153B measures the execution time of the related processing task 143 including the period during which execution is suspended (suspend) in the alternating execution based on the value of the status flag FL of the related processing task 143.

Return to step S33. The priority switching part 153 compares the execution time of the related processing task 143 measured by the counter 153B with the time period of the threshold values 152A (step S33). Specifically, the priority switching part 153 selects the time period to be compared with from the first time period T1 and the second time period T2 of the threshold values 152A based on the priority 133 of the related processing task 143. Here, the priority 133 of the related processing task 143 is the low priority PL. Therefore, the priority switching part 153 selects the second time period T2, and compares the execution time of the related processing task 143 with the second time period T2.

If the priority switching part 153 determines, based on the comparison result, that the condition that the execution time is longer than the second time period T2 is satisfied, that is, the execution time has become longer than (exceeded) the second time period T2 (YES in step S33), the priority switching part 153 outputs an excess notification indicating that the execution time has exceeded the second time period T2 to the multitask execution part 191, and performs priority switching processing (step S35). In the priority switching processing, the priority switching part 153 changes the priority 133 of the related processing task 143 in the task control information 131 to the high priority PH of the priority information 152B. Thereafter, the management processing PR is completed (step S31), and the processing is returned to step S23.

Note that the priority switching processing is executed when the execution time has exceeded the first time period T1 or the second time period T2 (step S35) in FIG. 10, but the point in time when the processing is executed is not limited thereto. For example, the priority switching processing may also be performed when the execution start condition of the related processing task 143 is satisfied. In this case, if the execution time of the related processing task 143 has exceeded the first time period T1 or the second time period T2, when the execution start condition of the related processing task 143 is satisfied thereafter, the priority switching part 153 sets the priority 133 of the related processing task 143 in the task control information 131 to the high priority PH or the low priority PL of the priority information 152B.

f3. Advantage of Switching Priority of Related Processing Task 143

According to the management processing PR of the scheduler 151 in FIG. 10, while the execution time of the related processing task 143 does not exceed the first time period T1, the priority is kept at the high priority PH. Therefore, related processing can be executed while maintaining its real-time property, and real-time control of an object using a result of related processing (such as anomaly detection processing) that is obtained for each execution time can be realized, for example. Also, when the execution time exceeds the first time period T1, the priority of the related processing task 143 is lowered, and another task such as the low priority control task 142, which is another control task, can be preferentially executed, and as a result, reliable real-time control of the object using an execution result (trajectory data of motion control) of the low priority control task 142 becomes possible. Therefore, execution of related processing in real time by a non-control task can be realized while ensuring the realization of real-time control of an object by a control task.

Also, when, as a result of being alternatingly executed with another task having the same priority, the execution time of the related processing task 143 has exceeded the threshold value 152A, the priority of the related processing task 143 is changed, and thereafter, alternating execution can be avoided, and the execution of the related processing task 143 can be completed in an execution time that does not exceed the threshold value. Also, the alternating execution is resolved (avoided), and therefore the execution time of another task decreases. With this, if another task is the low priority control task 142, for example, the real-time control of an object using the execution result of the task (trajectory data of motion control) can be reliably realized.

Also, even when alternating execution is not performed, when the execution time of the related processing task 143 exceeds the threshold value 152A, as a result of executing the related processing task 143, the processor resource is occupied over a comparatively long period of time, and the execution of another task is hindered. In this regard, when the execution time of the related processing task 143 exceeds the second time period T2, the scheduler 151 increases the priority of the related processing task 143 by changing the priority from the low priority PL to the high priority PH, and as a result, the execution of the related processing task 143 is completed earlier, and the resource can be released (assigned) to another task such as the low priority control task 142 at an earlier point in time. Also, when the execution time of the related processing task 143 exceeds the first time period T1, the scheduler 151 lowers the priority of the related processing task 143 by changing the priority from the high priority PH to the low priority PL, and as a result, the resource can be released to another task having a higher priority. With this, if another task is the low priority control task 142 for calculating a trajectory for motion control, for example, the trajectory data can be output to a motion program of the high priority control task 141 sooner, and the real-time control of an object can be reliably performed.

G. Scheduling Model of Related Processing Task 143

Figure 11:
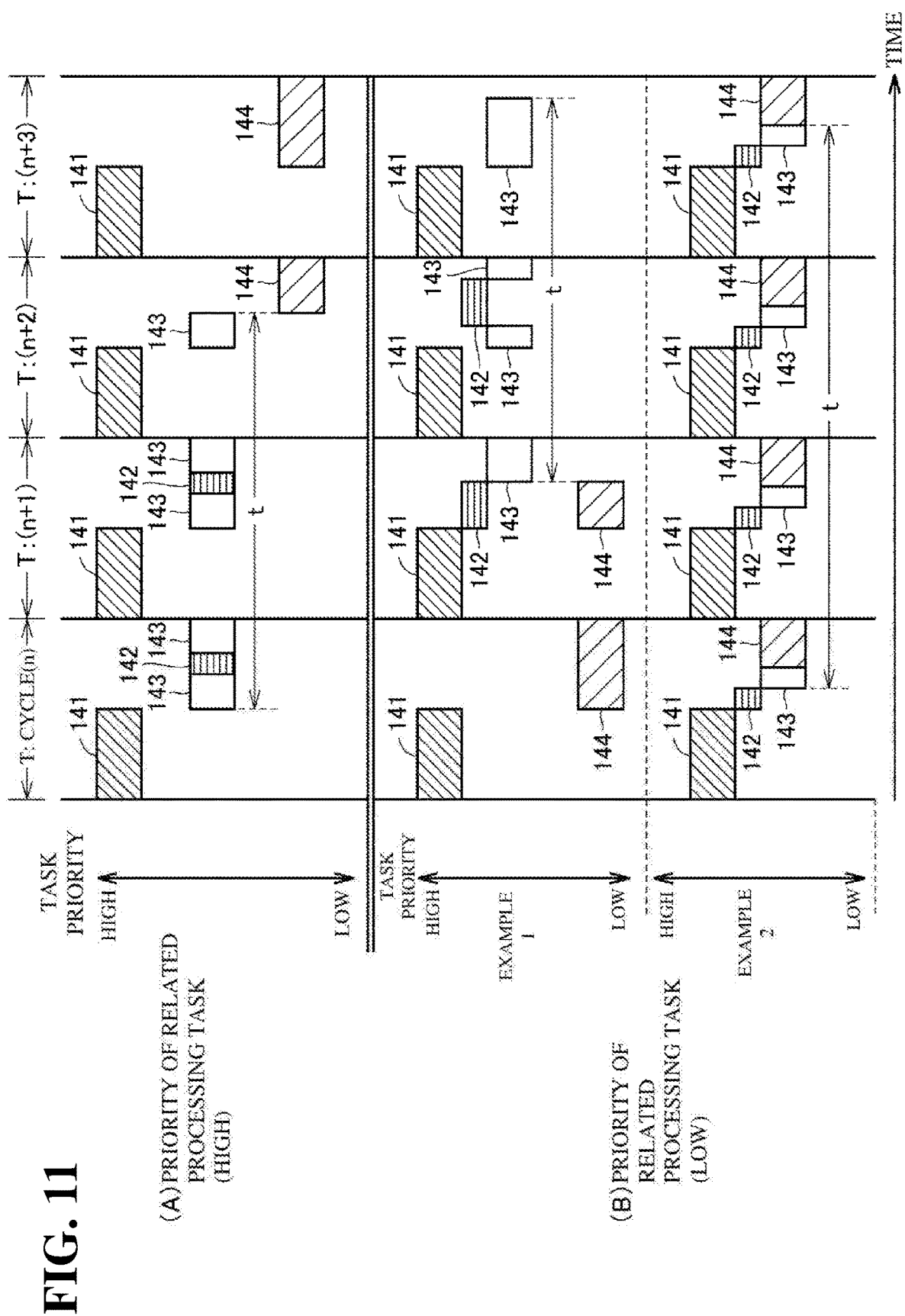
FIG. 11 is a diagram illustrating a scheduling model of the related processing task 143 according to the present embodiment.

Management of execution of the related processing task 143 performed by the management processing PR in FIG. 10 will be further described using a scheduling model of task execution. FIG. 11 is a diagram illustrating a scheduling model of the related processing task 143 according to the present embodiment. FIGS. 12A to 12C are diagrams illustrating switching of the priority of the related processing task 143 in association with FIG. 11. The vertical axis in FIG. 11 indicates the priority of a task, and the horizontal axis indicates elapse of time in which the nth cycle T, $(n+1)^{th}$ cycle T, $(n+2)^{th}$ cycle, $(n+3)^{th}$ cycle, and so on are shown.

In the present embodiment, the high priority PH of the related processing task 143 may be less than or equal to the priority of another task such as the low priority control task 142. For example, (A) of FIG. 11 shows a case where the high priority PH of the related processing task 143 is the same as the priority of the low priority control task 142. Also, in the present embodiment, the low priority PL of the related processing task 143 may be greater than or equal to the priority of another task such as the low priority control task 142. For example, (B) of FIG. 11 shows an example 1 and an example 2 in which the priority of the related processing task 143 is the low priority PL. The example 1 in (B) of FIG. 11 shows a case where the low priority PL of the related processing task 143 has a value between the priority of the low priority control task 142 and the priority of the service task 144. The example 2 shows a case in which the low priority PL of the related processing task 143 is lower than the priority of the low priority control task 142 and is the same as the priority of the service task 144.

g1. Scheduling Model when Related Processing Task 143 is at High Priority

As shown in (A) of FIG. 11, each cycle T is started in response to a cycle start signal in synchronization with the output of the timer 101. Here, it is assumed that priorities of respective tasks are set in the task control information 131 as shown in FIG. 12A. When the cycle T is started, first, the high priority control task 141 (control input program 161, control output program 162, and high priority control program 163) having the highest priority is executed, and thereafter, the multitask execution part 191 alternatingly executes the low priority control task 142 and the related processing task 143 that have the same priority 133, which is a high priority (=16) as indicated in the task control information 131 in FIG. 12A. The execution time t of the related processing task 143 (see (A) of FIG. 11) is measured so as to include a period of time in which execution is suspended in alternate execution (that is, the period of time in which low priority control task 142 is under execution).

If the execution time t in (A) of FIG. 11 is less than or equal to the first time period T1, the priority switching part 153 does not perform the priority switching processing, and as a result, the priority 133 of the related processing task 143 remains at the high priority in FIG. 12A. On the other hand, if the execution time t in (A) of FIG. 11 is greater than the first time period T1, the priority switching part 153 performs the priority switching processing. With this, the priority 133 of the related processing task 143 is switched from the priority in FIG. 12A to a low priority (=48) shown in FIG. 12B or 12C.

g2. Scheduling Model when Related Processing Task 143 is at Low Priority

Referring to the example 1 in (B) of FIG. 11, a case where the related processing task 143 is at the low priority PL as shown in FIG. 12B will be described. Similarly to (A) of FIG. 11, first, the high priority control task 141 is executed, and thereafter, another task is executed. In this case, according to the task control information 131 in FIG. 12B, the priority of the low priority control task 142 is higher than the priority of the related processing task 143. Therefore, the multitask execution part 191 executes the low priority control task 142, and then executes the related processing task 143.

In example 1, if the execution time t is longer than the second time period T2, the priority switching part 153 performs the priority switching processing. With this, the priority 133 of the related processing task 143 returns to the original high priority indicated by the task control information 131 in FIG. 12A.

Referring to the example 2 in (B) of FIG. 11, a case where the related processing task 143 is at a low priority as shown in FIG. 12C will be described. In the example 2 as well, similarly to (A) of FIG. 11, first, the high priority control task 141 is executed, and then another task is executed. In this case, according to the task control information 131 in FIG. 12C, the priority of the low priority control task 142 is higher than the priority of the related processing task 143, and the priority of the related processing task 143 is the same as the priority of the service task 144. Therefore, the multitask execution part 191 executes the low priority control task 142, and then alternatingly executes the related processing task 143 and the service task 144 that have the same priority.

In the example 2, if the execution time t of the related processing task 143 is longer than the second time period T2, the priority switching part 153 performs the priority switching processing. With this, the priority 133 of the related processing task 143 is switched so as to return to the original high priority indicated by the task control information 131 in FIG. 12A.

H. Another Example of Related Processing Task 143

Feature amount generation processing and anomaly detection processing are assigned to the related processing task 143 described above as processing related to the high priority control task 141 for real-time control, but the processing assigned to the related processing task 143 includes communication processing performed inside the control device 100. The communication processing may, specifically, include processing in which data related to the feature amount generation processing or the anomaly detection processing is communicated with various devices including the secondary storage device 108.

Also, the data related to the feature amount generation processing and the anomaly detection processing includes raw data received from the field device group 10 for generating a feature amount, the result of feature amount generation processing (generated feature amount and the like), the result of anomaly detection, and the like, but the data is not limited thereto. The communication processing of the result of the feature amount generation processing and the result of anomaly detection may include communication with the secondary storage device 108, and communication with an external device via the local network controller 110, the USB (universal serial bus) controller 112, the memory card interface 114, or the like. Also, the communication processing of the raw data and the result of anomaly detection may include communication with an external device via the internal bus controller 122, the field bus controller 118 or 120, I/O unit 124-1, 124-2, etc. or the like.

I. Another Example of Setting Information Regarding Task

Another example of setting information regarding a task described in FIGS. 8 and 9 will be described. FIG. 13 is a diagram illustrating an example of setting priorities and threshold values to a plurality of related processing tasks according to the present embodiment. In FIG. 5, the setting part 152 sets the priority information 152B and the threshold values 152A separately, but setting may be performed in one table format as shown in FIG. 13.

A case where the related processing task 143 includes a plurality of tasks RTS1 and RTS2 is shown in FIG. 13, for example. In FIG. 13, priorities (high priority PH, low priority PL) and threshold values (first time period T1 and second time period T2) are set to respective tasks RTSi by the setting part 152, in a table format.

Figure 14:
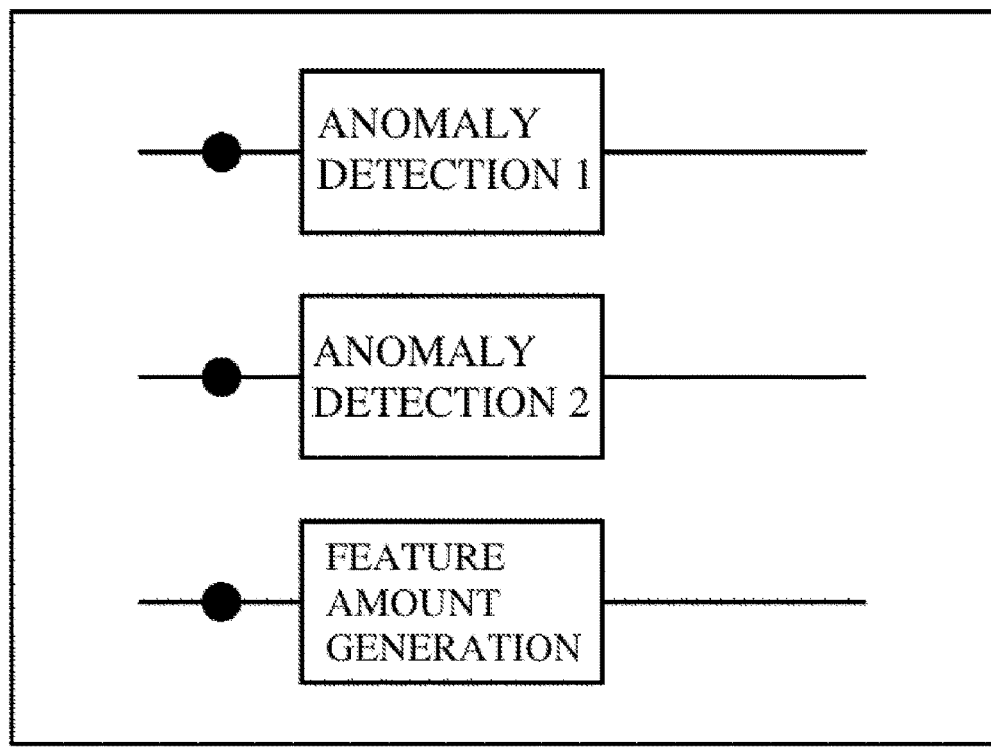
FIG. 14 is a diagram illustrating a method of assigning programs to a plurality of related processing tasks according to the present embodiment.

FIG. 14 is a diagram illustrating a method of assigning programs to a plurality of related processing tasks according to the present embodiment. The lower part of FIG. 14 shows an exemplary screen serving as a user interface for performing assignment of a program to a related processing task. The screen is displayed in the display unit 218 of the support device 200. The development program 222 analyzes the structure of the related processing program 165, extracts a plurality of programs (feature amount generation program and anomaly detection program) included in the related processing program 165 based on the result of analysis, and displays the extracted programs.

The user operates the input unit 216 and sets programs to be assigned to the related processing task 143 from the screen in FIG. 14. In the upper part of FIG. 14, a state is illustrated in which, when three tasks RTS1 to RTS3 can be set as the related processing task 143, the user has assigned the anomaly detection program and the feature amount generation program to the tasks RTSi (has set program names 134).

In this way, program configuration information of the related processing program 165 shown in the lower part of FIG. 14 can be provided as support information for the user to determine the program to be assigned to the tasks RTSi.

J. Collected Information and Debugging

In the present embodiment, the collection part 155 records information regarding scheduling as a log 135 when the related processing task 143 is executed. The debugging tool 227 generates information for supporting debugging based on collected information 228 obtained by collecting the logs 135, and provides the generated support information to the user.

In the present embodiment, "debugging" means the work of adjusting or changing user setting information (first time period T1, second time period T2, priority (high priority PH and low priority PL), programs (including program name and type thereof) to be assigned to the related processing task 143) set by the user. The user performs debugging so as to achieve the target that the real-time control can be reliably performed, for example.

FIG. 15 is a diagram illustrating an exemplary display of support information for debugging according to the present embodiment. FIGS. 16A and 16B are diagrams illustrating an example of the monitor information 153A and the log 135 according to the present embodiment. FIG. 17 is a diagram illustrating an example of the collected information 228 according to the present embodiment.

J1. Information to be Collected

In the present embodiment, the collection part 155 receives monitor information 153A output from the priority switching part 153 while the related processing task 143 is being executed, and stores the received monitor information 153A to the secondary storage device 108 as a log 135. The monitor information 153A is information regarding scheduling execution of the related processing task 143, and includes the current measurement time output from the counter 153B and the priority (one of high priority PH and low priority PL), for example.

FIG. 16A shows an example of the monitor information 153A, and FIG. 16B shows an example of the log 135. For example, a case is assumed where the first time period T1 is set to 2 msec and the second time period T2 is set to 10 msec with respect to a task RTS1, which is the related processing task 143. In this case, execution of the task RTS1 is started at the high priority PH, and when the execution is ended, the priority switching part 153 outputs monitor information 153A in FIG. 16A, and the items in FIG. 16B are recorded as the log 135, for example.

Specifically, the monitor information 153A in FIG. 16A indicates that the priority when the execution of the task RTS1 is ended is a "high priority", and the execution is ended when 0.2 msec has elapsed since the execution was started at this high priority. Also, the log 135 in FIG. 16B indicates that the priority has been switched twice since the execution of the task RTS1 was started until completion (that is, from high priority to low priority, and to high priority), and 12.2 msec was required as the total execution time.

The debugging tool 227 of the support device 200 receives a log 135 from the control device 100, and generates collected information 228 based on the log 135. As shown in FIG. 17A, the collected information 228 includes, with respect to the related processing task 143, statistical information such as a task name 71, the number of executions 82, which is a total number of executions, representative values of the execution time (minimum, average, maximum) 83, and representative values of the number of priority switching (minimum, average, maximum) 84. The representative values of the execution time 83 show a minimum value, an average value, and a maximum value of the execution times of 21103 times of task execution, which is indicated by the number of executions 82. Also, the representative values of the number of priority switching 84 shows a minimum value, an average value, and a maximum value of the number of priority switching counted in the respective 21103 times of task execution, which is indicated by the number of executions 82.

Also, the collected information 228 includes information in FIG. 17B. FIG. 17B shows a breakdown of information regarding the 21103 times of execution in FIG. 17A. Specifically, the collected information 228 includes, with respect to the related processing task 143, the task name 71, statistical information 96 and 97 of cases when the execution was ended with the priority being a "high priority", and statistical information 98 and 99 of cases when the execution was ended with the priority being a "low priority" for each information set (that is, a set of high priority PH, low priority PL, first time period T1, and second time period T2).

The statistical information 96 indicates that, with respect to the task RTS1, the number of cases is 23 in total where priority switching has been performed four times from the start of the execution to the end thereof and the execution was ended at a "high priority", when the task RTS1 was executed based on a specific information set (set of high priority, low priority, first time period T1, and second time period T2). Also, the statistical information 97 indicates that, with respect to the 23 times of task execution, the minimum value, the average value, and the maximum value of the execution time are respectively 0.1 msec, 0.8 msec, and 1.9 msec.

Similarly, the statistical information 96 indicates that, with respect to the task RTS1, the number of cases is 11 in total where priority switching has been performed five times from the start of the execution to the end thereof and the execution was ended at a "low priority", when the task RTS1 was executed based on the aforementioned specific information set. Also, the statistical information 99 indicates that, with respect to the 11 times of task execution, the minimum value, the average value, and the maximum value of the execution time are respectively 0.1 msec, 0.4 msec, and 0.5 msec.

J2. Debugging Tool

Debugging support information generated by the debugging tool 227 based on the collected information 228 is provided to the user on a screen, of the display unit 218, shown in FIG. 15. For example, an image based on the statistical information 96 and 97 in FIG. 17B is displayed in the upper part of the screen in FIG. 15, and an image based on the statistical information 98 and 99 in FIG. 17B is displayed in a lower part thereof.

The user can obtain guidance (hints) for determining whether or not the threshold values 152A (first time period T1 and second time period T2) or the priority information 152B (high priority PH, low priority PL) that has been set to the task RTS1 is appropriate for reliably performing real-time control based on the result of comparison between the collected information 228 in the screen in FIG. 15 and the target for real-time control. Also, the user can also obtain guidance for determining whether the program assigned to the task RTS1 is appropriate based on the result of comparison.

Based on the above determination, the user can change the threshold values 152A (first time period T1 and second time period T2) or the priority information 152B (high priority PH, low priority PL) that is assigned to the task RTS1 via the user interface in FIG. 8, for example. Alternatively, the user can change the programs assigned to the task RTS1 via the user interface in FIG. 13, for example.

For example, when the number of times that the task RTS1 was switched to a low priority is larger than the target, it can be presumed that the task RTS1 and another task were alternatingly executed, so that as a result, the execution time increased, and the priority was switched to a low priority. In this case, the user can reduce the number of times the priority is switched to a low priority by increasing the first time period T1 or by changing the original value of the high priority PH such that the alternating execution can be avoided.

Also, for example, when the number of times the task RTS1 was switched to a high priority is larger than the target, it can be presumed that the task RTS1 and another task were alternatingly executed, so that as a result, the execution time increased, and the priority was switched to a high priority. In this case, the user can reduce the number of times the priority is switched to a high priority by increasing the second time period T2 or by changing the original value of the low priority PL such that the alternating execution can be avoided.

Also, when a feature amount generation program was assigned to the task RTS1, if the task execution time is longer than the target or the number of times of switching to a low priority is larger than the target, it can be presumed that the execution of the feature amount generation program placed a heavy load on the processor 102.

Specifically, the feature amount generation program may include processing in which a computation amount is large (computation time is long) such as a fast Fourier transform. The user can change the feature amount generation program by executing the development program 222 in order to reduce the load. For example, the user can change the feature amount generation program such that the computation amount decreases by changing the types of the feature amounts to be generated or by reducing the number of types thereof.

The support device 200 transmits the changed threshold values 152A, the changed priority information 152B, or the changed feature amount generation program to the control device 100. The scheduler 151 generates the task control information 131 based on the changed information, and re-executes the task RTS based on the task control information 131. The debugging tool 227 displays a monitor screen (FIG. 15) based on collected information 228 that has been acquired when re-execution was performed. This monitor screen provides, to the user, support information for determining whether or not the changes in the threshold value (first time period T1, second time period T2), the priority information (high priority PH, low priority PL), the feature amount generation program, or the like by debugging are appropriate for reliably performing real-time control.

K. Other Determination Condition for Priority Switching

In the embodiment described above, the priority switching processing (step S35 in FIG. 10) is performed when the execution time has exceeded the first time period T1 or the second time period T2 (YES in step S33), but the condition for performing the priority switching processing is not limited to the condition that the execution time has exceeded the first time period T1 or the second time period T2.

For example, the scheduler 151 may count the number of times the execution time of the related processing task has exceeded the first time period T1 or the second time period T2. The scheduler 151 may perform the priority switching processing when this count value becomes a predetermined N (N>2) times or more, as the condition for performing the priority switching processing. Note that the value of N can be set by the user.

L. Multicore Operation Mode

In the embodiment described above, a case has been described in which, when the control device 100 is in a single-core operation mode, the scheduler 151 executes the related processing task 143 using one processor core of the processor 102. Here, a multicore operation mode in which two or more processor cores included in the processor 102 are used will be described. When the control device 100 is switched to the multicore operation mode, the scheduler 151 activates the core switching part 156.

The processor core is constituted by combining devices for executing a task such as an arithmetic and logic unit and a program counter. Therefore, in the multicore operation mode, a plurality of tasks can be executed in parallel using a plurality of processor cores. In the present embodiment, a case where the processor 102 includes four processor cores Core1 to Core4 as the processor cores will be described, for example, but the number of processor cores needs only be two or more, and is not limited to four. In the following, the four processor cores will be described using core numbers Core1 to Core4, which are identifiers thereof.

L1. Setting Core Information

FIG. 18 is a diagram illustrating the core information 136 according to the present embodiment. The core information 136 indicates information regarding the core processor that executes the related processing task 143 in the multicore operation mode. The support device 200 accepts the core information 136 based on a user operation made on the input unit 216, and transmits the accepted core information 136 to the control device 100. The processor 102 of the control device 100 stores the core information 136 received from the support device 200 to the secondary storage device 108.

When executing a task, the processor 102 reads out the core information 136 from the secondary storage device 108, and deploys it in the main storage device 106.

As shown in FIG. 18, the core information 136 includes the data "operating core designation 137" and "assignment mode 138" for each task RTSi of the related processing task 143. The operating core designation 137 indicates information for designating the processor core for executing the associated task RTSi. The assignment mode 138 includes data 139 for designating whether the processor core that executes the task RTSi is "dynamically" switched or the processor core is fixed, and data 140 indicating, when "fixed" is designated, the processor core that should execute the task RTSi.

As shown in FIG. 18, specifically, Core2 and Core3 are assigned to a task "RTS1", and the assignment mode is given as "dynamic". This indicates that the processor core that executes the task "RTS1" can be switched between Core2 and Core3. In contrast, Core2 and Core3 are assigned to a task "RTS2", and the assignment mode is given as "fixed (high=2, low=3)". This designates that, when the task "RTS2" is executed, the task "RTS2" is executed by Core2 if the priority is a high priority, and is executed by Core3 if the priority is a low priority.

L2. Multicore Scheduling

The scheduling for executing the related processing task 143 (task RTSi) in the multicore operation mode will be described next. In the multicore operation mode, the core switching part 156 receives a CPU usage rate 159 from the OS 190. The OS 190 measures the CPU usage rate 159. The CPU usage rate 159 indicates the ratio, for each of Core1 to Core4, for example, that the processor core is in an idle state in which the core is not used for executing a task or the like (rate of the idle state per unit time:empty ratio E).

The core switching part 156 includes a command for, when the scheduler 151 causes the related processing task 143 to transition to an executing state, determining the processor core that should execute the related processing task 143 based on the core information 136, or based on both of the CPU usage rate 159 and the core information 136. The core switching part 156 outputs a core designation instruction value 158 indicating the determined processor core to the OS 190. These operations are also referred to as "multicore scheduling" by the scheduler 151. The OS 190 executes the related processing task 143 that has been transitioned to an executing state using the processor core designated by the core designation instruction value 158.

In the multicore scheduling, one of operation modes M1 to M7 described below is entered. Note that, in the operation modes M1 to M7, similarly to the single-core operation mode, the multitask execution part 191 first executes the high priority control task 141, which is a primary fixed cycle task, in one or more processor cores of Core1 to Core4.

L3. Scheduling Model when One Related Processing Task 143 is Executed

Figure 19B:
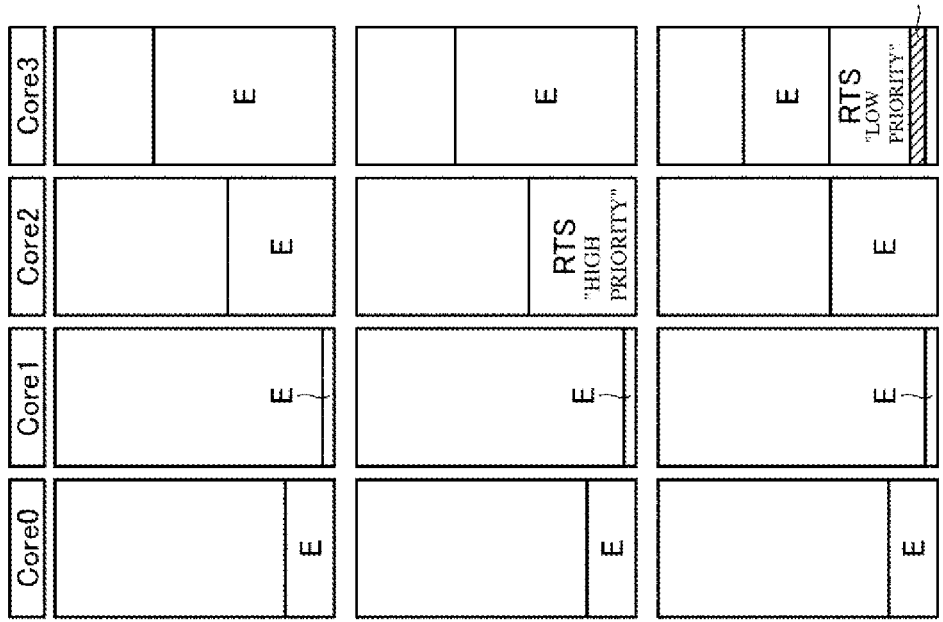
FIGS. 19A and 19B are diagrams illustrating an example of executing one related processing task 143 in multicore scheduling according to the present embodiment.
Figure 19A:
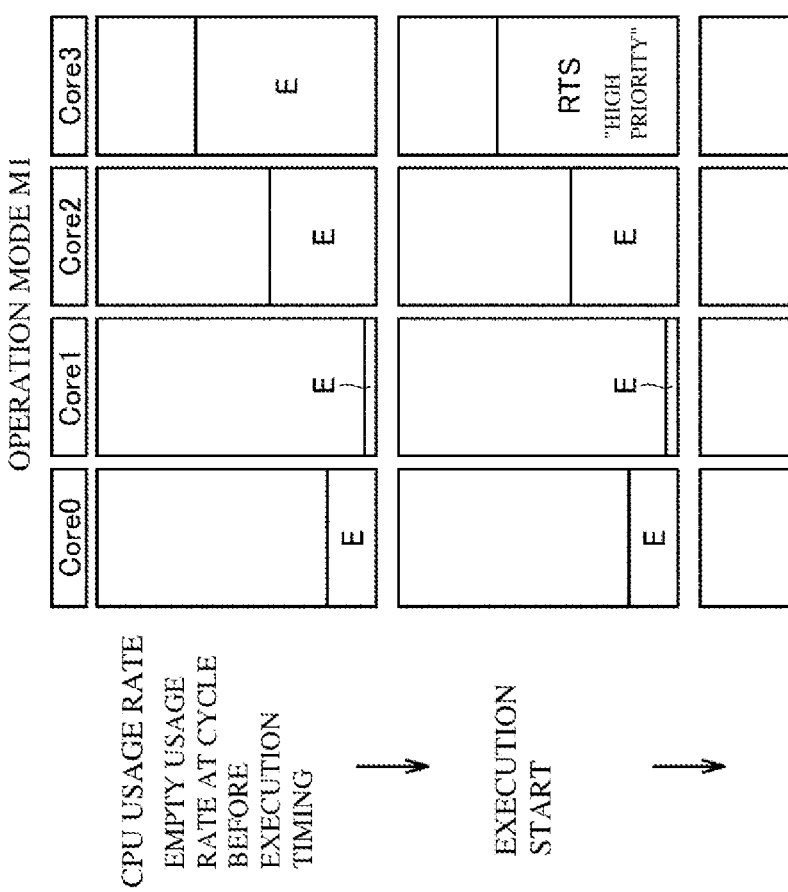

FIGS. 19A and 19B are diagrams illustrating an example of executing one related processing task 143 in multicore scheduling according to the present embodiment. In FIG. 19, a case will be described in which, first, the related processing task 143 (hereinafter, also referred to as a task RTS) at a high priority is to be executed, and then a task RTS at a low priority is to be executed.

The operation mode M1 in FIG. 19A shows a case where the core information 136 indicates that Core2 and Core3 are assigned to a task "RTS", and the assignment mode is "dynamic". When "dynamic" is designated, the core switching part 156 determines the processor core whose empty ratio E is largest (that is, having a large resource that can be assigned to the related processing task 143) as the processor core that should execute the task RTS based on the CPU usage rate 159 and the core information 136.

As shown in FIG. 19A, the core switching part 156 determines that the empty ratio E of Core3 is larger than the empty ratio E of Core2 from the CPU usage rate 159 before executing the task RTS. Therefore, the core switching part 156 determines Core3 having a larger empty ratio E as the processor core that should execute the task RTS based on the determination, and outputs a core designation instruction value 158 indicating the determined Core3. With this, the multitask execution part 191 executes the task RTS at a high priority in Core3.

Next, a case will be described where the task RTS has been executed in Core3, and the priority thereof is switched by the priority switching part 153 from a high priority to a low priority. When executing the task RTS at a low priority, the core switching part 156 determines that the empty ratio E of Core3 is larger than the empty ratio E of Core2 from the CPU usage rate 159, and determines Core3 having a larger empty ratio E as the processor core that should execute the task RTS based on the determination, and outputs a core designation instruction value 158 indicating Core3. Accordingly, the task RTS at a low priority is executed in Core3.

In contrast, the operation mode M2 in FIG. 19B shows a case where the core information 136 indicates that Core2 and Core3 are assigned to the task "RTS", and the assignment mode is "fixed" (Core2 when in a high priority, and Core3 when in a low priority).

Therefore, the core switching part 156 determines the processor core that should execute the task RTS based on the core information 136 regardless of the CPU usage rate 159. As shown in FIG. 19B, when the task RTS is in a high priority, for example, the core switching part 156 outputs a core designation instruction value 158 indicating Core2. When the task RTS has been executed in Core2, and the priority is switched from a high priority to a low priority by the priority switching part 153, the core switching part 156 determines Core3 as the processor core that should execute the task RTS based on the core information 136, and outputs a core designation instruction value 158 indicating Core3. Accordingly, the multitask execution part 191 executes the task RTS at a low priority in Core3.

Figure 20B:
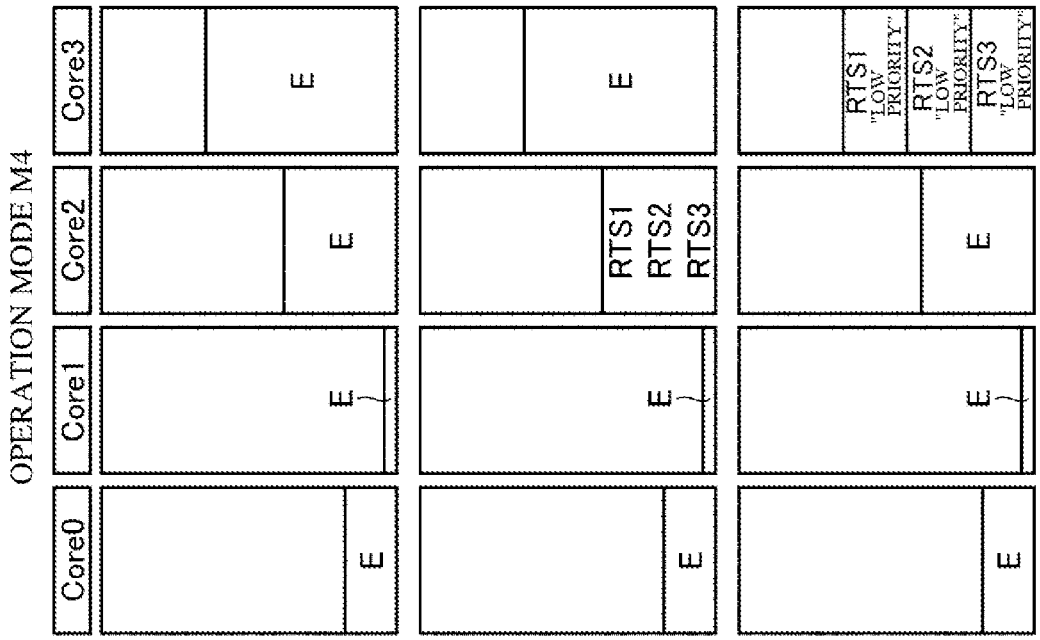
FIGS. 20A and 20B are diagrams illustrating an example of executing a plurality of related processing tasks 143 in multicore scheduling according to the present embodiment.
Figure 20A:
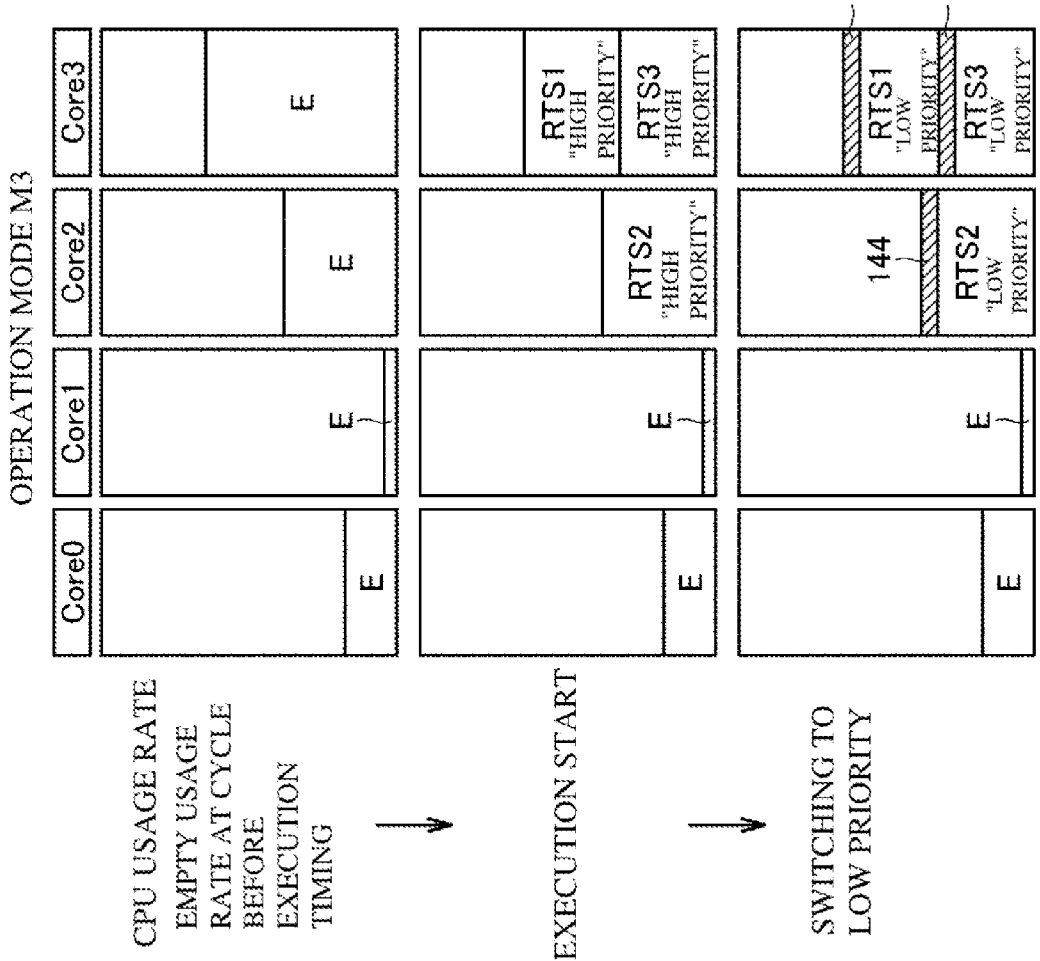

L4. Scheduling Model when Plurality of Related Processing Tasks 143 are Executed FIGS. 20A and 20B are diagrams illustrating an example of executing a plurality of related processing tasks 143 in multicore scheduling according to the present embodiment. The operation modes M1 and M2 in FIGS. 19A and 19B shows a case where one task RTS is executed, but in operation modes M3 and M4 in FIGS. 20A and 20B, the scheduler 151 schedules a plurality of tasks RTS. A case will be described where tasks RTS1 to RTS3 at a high priority are executed, and then tasks RTS1 to RTS3 at a low priority are executed, with reference to FIGS. 20A and 20B.

First, the operation mode M3 in FIG. 20A shows a case where the core information 136 indicates that Core2 and Core3 are assigned to the tasks "RTS1 to RTS3", and the assignment mode is "dynamic". The operation mode M4 in FIG. 20B shows a case where the core information 136 indicates that Core2 and Core3 are assigned to the tasks "RTS1 to RTS3", and the assignment mode is fixed (Core2 when in a high priority, and Core3 when in a low priority).

In the operation mode M3 in FIG. 20A, the core switching part 156 may determine that Core3 having a highest empty ratio E as the processor core that should execute the tasks RTS1 to RTS based on the CPU usage rate 159, in order to execute the tasks RTS1 to RTS3 having the same priority (high priority).

In this case, three tasks RTS1 to RTS3 are executed in parallel (alternatingly executed) in one processor core (that is, Core3). Therefore, the execution time of each task may be comparatively lengthened. Therefore, in order to reduce the execution time, if the empty ratio E of Core3 is a threshold value or more, the core switching part 156 determines that Core3 is the processor core that should execute the tasks RTS1 and RTS2, and determines another processor core (that is, Core2) for the task RTS3, for example. With this, when a plurality of related processing tasks 143 are executed, the load is distributed between the processor cores, and the execution time of each related processing task 143 can be reduced.

Also, when the priority of the tasks RTS1 to RTS3 are switched to a low priority, the core switching part 156 determines one processor core having a large empty ratio E indicated by the CPU usage rate 159 (that is, Core3) as the processor core that executes the tasks RTS1 to RTS3. Alternatively, it may be determined that the tasks RTS1 and RTS2 are to be executed by Core3, and the task RTS3 is to be executed by another processor core (that is, Core2). Accordingly, the above-described load distribution between the processor cores and reduction of execution time of each task can be realized.

In the operation mode M4 in FIG. 20B, the core switching part 156 determines Core2 as the processor core that will execute the tasks RTS1 to RTS3 in accordance with the core information 136 regardless of the CPU usage rate 159, in order to execute the tasks RTS1 to RTS3 having a same high priority. The scheduler 151 performs scheduling such that the tasks RTS1, RTS2, and RTS3 are sequentially executed in the stated order in Core2.

Also, when the priority of the tasks RTS1 to RTS3 is switched to a low priority, the core switching part 156 determines Core3 as the processor core that will execute the tasks RTS1 to RTS3 in accordance with the core information 136 regardless of the CPU usage rate 159. The scheduler 151 performs scheduling such that the tasks RTS1, RTS2, and RTS3 are sequentially executed in the stated order in Core3.

L5. Scheduling Model 2 when Plurality of Related Processing Tasks 143 are Executed FIGS. 21A and 21B are diagrams illustrating another example of executing a plurality of related processing tasks 143 in multicore scheduling according to the present embodiment.

In the operation mode M5 in FIG. 21A, the core switching part 156 determines the processor core that will execute the tasks RTS1 to RTS3 in accordance with the CPU usage rate 159 and the core information 136, similarly to FIG. 20A.

The operation mode M6 in FIG. 21B shows a modification of the scheduling model of the operation mode M4 in FIG. 20B. In FIG. 20B, the scheduler 151 performs scheduling such that tasks RTS1, RTS2, and RTS3 are sequentially executed in the stated order in Core3 (or Core2). Therefore, the task RTS3, which is executed at last, needs to wait for the execution of the other tasks being ended, and the execution time of the task RTS3 increases.

In contrast, in the operation mode M6 in FIG. 21B, the scheduler 151 performs scheduling such that the tasks RTS1 to RTS3 are executed in parallel (that is, alternatingly executed) in Core3 (or Core2). With this, the execution times of the respective tasks can be leveled.

Also, in the present embodiment, the user can designate the operation mode M4 (see FIG. 20B) or the operation mode M6 (see FIG. 20B) as the mode for executing a plurality of tasks in accordance with the core information 136.

Figure 22:
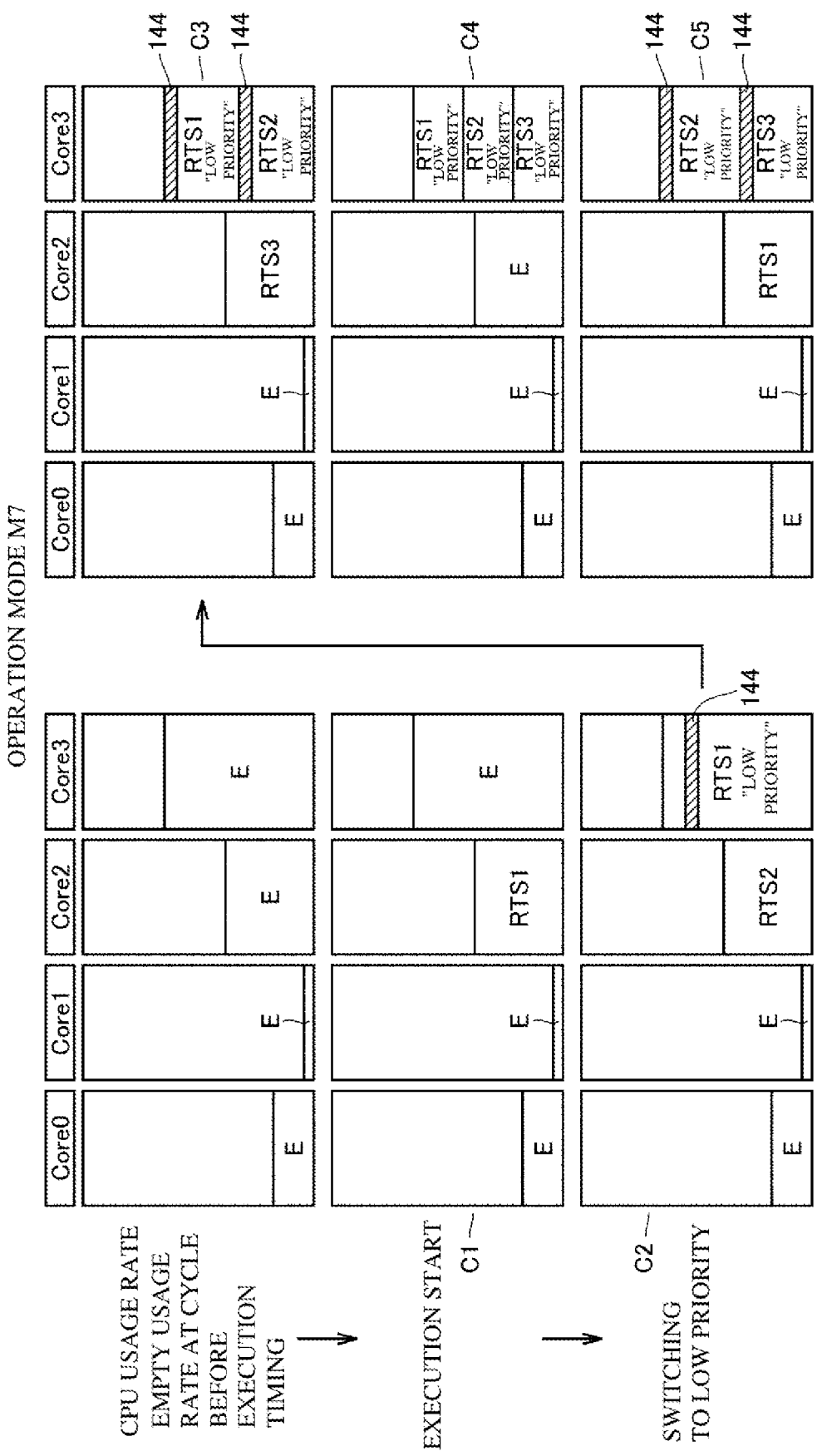
FIG. 22 is a diagram illustrating yet another example of executing the plurality of related processing tasks 143 in multicore scheduling according to the present embodiment.

L6. Scheduling Model 3 when Plurality of Related Processing Tasks 143 are Executed FIG. 22 is a diagram illustrating yet another example of executing a plurality of related processing tasks 143 in multicore scheduling according to the present embodiment. The operation mode M7 in FIG. 22 shows a case where the core information 136 indicates that Core2 and Core3 are assigned to tasks "RTS", and the assignment mode is "fixed (Core2 when in a high priority, and Core3 when in a low priority)".

In the operation mode M7, the core switching part 156 determines Core2 as the processor core that executes tasks RTS1 to RTS3 at a high priority based on the core information 136, regardless of the CPU usage rate 159. Similarly, the core switching part 156 determines Core3 as the processor core that executes tasks RTS1 to RTS3 at a low priority.

According to the operation mode M7, when a plurality of related processing tasks 143 at a high priority transition to an executing state, the real-time property of each task can be realized. Specifically, as shown in FIG. 22, when tasks RTS1 to RTS3 at a high priority are executed, the scheduler 151 performs scheduling such that the tasks RTS1, RTS2, and RTS3 are sequentially executed in the stated order in Core2 (see transition from a case C1 to a case C2, and then to a case C3 in FIG. 22). Therefore, each task at a high priority is executed by occupying a usable resource of Core2, and the execution time of the task can be reduced.

Next, when the priority of the task RTS1 has been switched to a low priority because the execution time has exceeded the first time period T1 when the task RTS1 at a high priority was executed by Core2, the core switching part 156 determines Core3 as the processor core that executes the task RTS1 in accordance with the core information 136 (case C2). In this case, the execution of the task RTS1 at a low priority in Core3, and the execution of the task RTS2 at a high priority in Core2 are performed in parallel.

Next, when the execution time of the task RTS2 having a high priority in Core2 has exceeded the first time period T1 (but the execution time of the task RTS1 in Core3 has not exceeded the second time period T2), the priority of the task RTS2 is switched to a low priority. In this case, the core switching part 156 determines Core3 as the processor core that executes the task RTS2 in accordance with the core information 136. Therefore, the execution of the task RTS1 and the task RTS2 in Core3 and the execution of the task RTS3 at a high priority in Core2 are executed in parallel (case C3).

Next, when the execution time of the task RTS3 having a high priority in Core2 has exceeded the first time period T1 (but the execution times of the tasks RTS1 and RTS2 in Core3 each have not exceeded the second time period T2), the priority of the task RTS3 is switched to a low priority. In this case, the core switching part 156 determines Core3 as the processor core that executes the task RTS1 in accordance with the core information 136. Therefore, the tasks RTS1 to RTS3 are alternatingly executed in Core3 (case C4).

Finally, when the execution time of the task RTS1 at a low priority in Core3 has exceeded the second time period T2 (but the execution times of the tasks RTS2 and RTS3 in Core3 each have not exceeded the second time period T2), the priority of the task RTS1 is switched to a high priority (case C5). In this case, the execution of the task RTS1 in Core2 and the alternating execution of the tasks RTS2 and RTS3 in Core3 are performed in parallel.

In the multicore operation mode according to the present embodiment, when the plurality of tasks RTS1 to RTS3 are to be executed, the user can designate in which of the operation modes M4, M6, and M7 described above the tasks are to be executed.

M. Modifications

Figure 23:
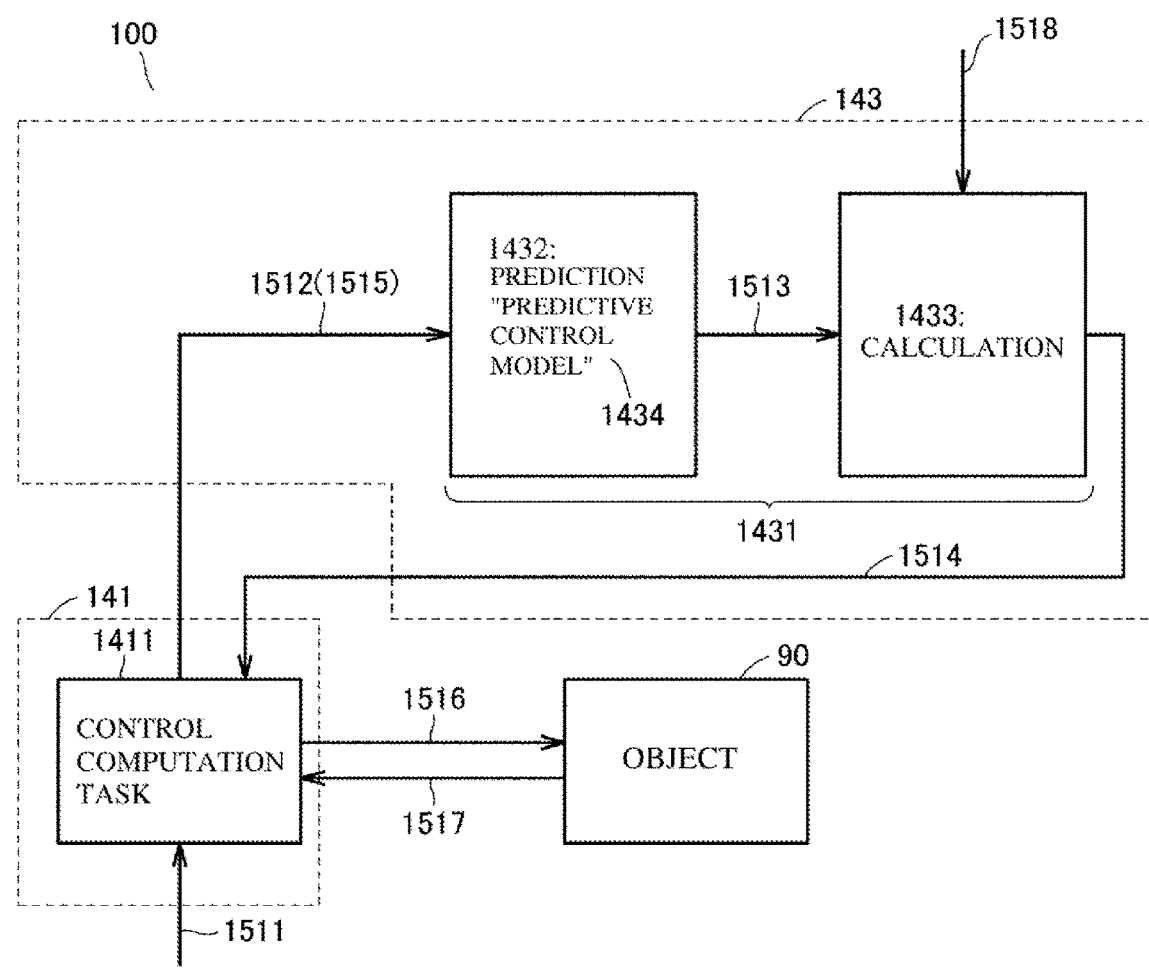
FIG. 23 is a schematic diagram illustrating a modification of the related processing task 143 according to the present embodiment.
Figure 24:
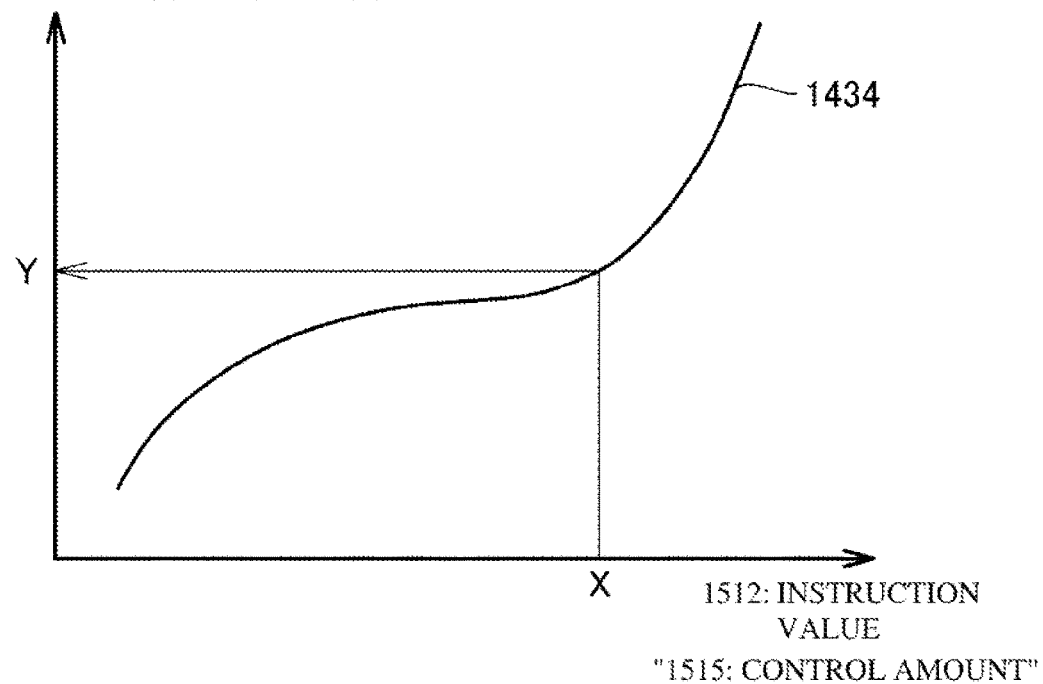
FIG. 24 is a diagram schematically illustrating an example of a predictive control model according to the present embodiment.

FIG. 23 is a schematic diagram illustrating a modification of the related processing task 143 according to the present embodiment. FIG. 24 is a diagram schematically illustrating an example of a predictive control model according to the present embodiment. In the present embodiment described above, the anomaly detection program has been described as an example of the related processing task 143, but the related processing is not limited to the anomaly detection program. For example, the related processing task 143 described in "c2. Functional configuration" may include a predictive control program for controlling an object (hereinafter, referred to as an object 90) that is to be controlled by the control device 100 using a predictive control model. The object 90 is an apparatus or the like included in the field device group 10 in FIG. 1. The predictive control program includes a command for predicting the control amount of the object 90 using an instruction value, of the variables, that is to be given to the object 90, and outputs a correction value of the control parameter. As a result of executing such a command, the correction value calculation processing 1431 in FIG. 23 is realized.

In the present embodiment, the predictive control model is a process model that is to be applied in order to realize optimizing control of the object 90 while predicting a response of the object 90, for example.

Note that the instruction value and the control amount are indicated by the variables stored in the internal DB 130 in FIG. 5. The instruction value and control amount are data (input data and output data) that is exchanged with the field device group 10 in FIG. 1 when the control input program 161 and the control output program 162 perform the I/O refresh processing in FIG. 5, and are set as variables in the internal DB 130.

The related processing task 143 to be executed in the control device 100 and a control computation task 1411, which is an example of the high priority control task 141, are shown in FIG. 23. The control computation task 1411, upon being executed, generates an instruction value 1516 for each control cycle in accordance with a predetermined pattern 1511, outputs the instruction value 1516 to the object 90, and receives a control amount 1517, which is a response (feedback value) to the instruction value 1516, from the object 90.

The related processing task 143 includes prediction processing 1432 for calculating an estimated control amount 1513, which is an estimated value of the control amount of the object 90, using an output from the control computation task 1411 (that is, the current instruction value 1512 that is output from the control device 100 to the object 90) and the predictive control model 1434, and calculation processing 1433 for calculating an correction value 1514 by performing correction such that the difference between the estimated control amount 1513 and an ideal control amount 1518 (target control amount) is in a predetermined range. In FIG. 23, the instruction value 1512 and the control amount 1515 are respectively similar values of the instruction value 1516 and the control amount 1517.

The control computation task 1411 calculates a control output (instruction value 1516) to the object 90 in accordance with the calculated correction value 1514. The calculated instruction value 1516 is output to control the object 90.

The aforementioned predictive control model 1434 is created in advance through machine learning based on the properties of the object 90. Alternatively, the predictive control model 1434 is created in advance by a user operation. An example of the predictive control model 1434 is schematically shown in FIG. 24. As shown in FIG. 24, the predictive control model 1434 is illustrated as a graph representing the correlation between the instruction value 1512 (or control amount 1515) and the estimated control amount 1513, for example. Therefore, in the prediction processing 1432, the value Y of the estimated control amount 1513 can be estimated (calculated) from a value X of the instruction value 1512 (or control amount 1515) based on such a predictive control model 1434. Note that the predictive control model 1434 is not limited to such a correlation graph.

Note that the estimated control amount 1513 estimated using the predictive control model 1434 may be a current value (value corresponding to the current control cycle, for example) or a future value (value corresponding to the next control cycle and thereafter, for example).

Also, when the predictive control model 1434 is created through machine learning, the predictive control model 1434 may be created through machine learning using a neural network, for example.

Also, in the calculation processing 1433, a difference between the estimated control amount 1513 output from the prediction processing 1432 and the ideal control amount (target control amount) 1518 is calculated, and the correction amount of the instruction value 1516 may be estimated (calculated) from the calculated difference in control amount using a predictive control model that is not illustrated.

The control computation task 1411 receives the correction value 1514, generates the instruction value 1516 for which the received correction value 1514 is fed back, and outputs the generated instruction value 1516 to the object 90.

In summary, a predictive control model 1434 in FIG. 24 is created in advance in which the estimated control amount 1513 is an objective variable, and the instruction value 1512 is an explanatory variable. Therefore, in FIG. 23, the current instruction value 1512 (instruction value 1516) to be given to the object 90 is input to the predictive control model 1434, and the estimated control amount 1513 of the object 90 in the next control cycle is output. Next, the correction value 1514 that has been obtained by performing correction such that the difference between the estimated control amount 1513 and the ideal control amount 1518 (target control amount) is in a predetermined range, and the instruction value 1516 is re-written using the calculated correction value 1514.

Also, the predictive control model 1434 in FIG. 24 may be created in advance in which the estimated control amount 1513 is an objective variable, and the control amount 1515 is an explanatory variable. In this case, in FIG. 23, the current control amount 1515 (control amount 1517) to be given to the object 90 is input to the predictive control model 1434, and the estimated control amount 1513 of the object 90 in the next control cycle is output. Next, the correction value 1514 that has been obtained by performing correction such that the difference between the estimated control amount 1513 and the ideal control amount 1518 (target control amount) is in a predetermined range, and the instruction value 1516 is re-written using the calculated correction value 1514.

As described above, according to the correction value calculation processing 1431 of the related processing task 143, the correction value 1514 of the control parameter can be output by predicting the control amount of the object 90 using the instruction value 1512 to be given to the object 90. Also, the correction value to be given to the object 90 can be predicted using the control amount 1515 of the object 90.

Also, in the calculation processing 1433 in FIG. 23, the correction value 1514 is calculated by performing correction such that the difference between the estimated control amount 1513 and the ideal control amount (target control amount) 1518 is in a predetermined range, but the method of calculating the correction value 1514 is not limited to such a correction method. For example, the calculation processing 1433 may be processing for calculating the correction value 1514 by performing predetermined computation using the estimated control amount 1513, for example.

Also, in FIG. 23, the instruction value 1516 based on the correction value 1514 that has been estimated (calculated) using the predictive control model 1434 is output to the object 90 for each control cycle, but the output cycle of the instruction value 1516 is not limited to the control cycle. For example, the instruction value 1516 may be output in a cycle longer than the control cycle, depending on the properties of the object 90. In this case, the instruction value 1516 based on the correction value 1514 obtained by estimating (calculating) the object 90 using the predictive control model 1434 in a cycle longer than the control cycle may be output to the object 90.

Also, the predetermined pattern 1511 may include a position pattern that indicates the trajectory on which the object 90 should move. In this case, the position of the object 90 can be controlled in accordance with the trajectory (estimated trajectory on which the object 90 should move) that is indicated by the instruction value 1516 based on the correction value 1514 generated using the predictive control model 1434.

Note that, in FIG. 23, the control computation task 1411 generates the instruction value 1516 in accordance with the predetermined pattern 1511, but the control computation task 1411 may also generate the instruction value 1516 without using the pattern 1511.

N. Effects of Present Embodiment

In the priority switching processing according to the present embodiment, the priority is kept at the high priority PH while the execution time is not longer than (does not exceed) the first time period T1. Therefore, related processing can be executed while maintaining the real-time property, and the real-time control of an object using the result of the related processing that is obtained for each execution time can be realized, for example. Also, another task can be preferentially executed by reducing the priority of the related processing task 143 when the execution time becomes longer than (exceeds) the first time period T1, and as a result, when another task such as the low priority control task 142 is executing processing (trajectory calculation processing for motion control) that contributes to the real-time control, the high priority control task 141 can perform real-time control on the object using the execution result. Therefore, real time execution of related processing by a non-control task can be realized while ensuring realization of real-time control of an object by the control task.

Also, in the multicore scheduling, priority switching processing is performed on the related processing task 143 while preferentially executing a control task of an object in each processor core. Also, priority switching processing is performed on a plurality of related processing tasks 143 while preferentially executing the control task, using two or more processor cores at the same time.

With this, in the multicore scheduling as well, real time execution of related processing by a plurality of non-control tasks can be realized while ensuring real-time control of an object by the control task.

O. Configuration of Embodiment

According to the embodiment described above, the control device 100 that controls an object includes task control information 131 for storing, in association with a plurality of tasks including a control task (high priority control task 141) for performing real-time control on the object and a non-control task for performing related processing related to the real-time control, priorities with respect to execution of the respective tasks by a processor, and a scheduler 151 that adjusts the execution sequence of the non-control tasks in accordance with the priorities. The control task is set to have a highest priority (that is, the non-control task is set to have a priority that is lower than the priority of the control task). The scheduler 151 includes a priority switching part 153 that switches, with respect to the non-control task, the priority of the non-control task to a lower priority (from a high priority PH to a low priority PL) when the execution time t of the non-control task has exceeded a first time period T1 for executing the related processing in real time.

According to the above-described configuration, priority switching is performed such that the priority of the non-control task is kept at the high priority PH while the execution time is less than or equal to the first time period T1 for real time execution, and when the execution time exceeds the first time period T1, the priority is set to the low priority PL. Therefore, while the execution time is less than or equal to the first time period, the non-control task (related processing task 143) can be executed in real time by comparatively increasing the priority while maintaining real-time control of an object, and as a result, the result of the related processing can be reliably reflected on real-time control of the object.

Also, when the execution time exceeds the first time period for real time execution, the resource can be preferentially assigned to another control task (low priority control task 142, for example) by reducing the priority. With this, the result of processing by another control task can be reliably reflected on the real-time control of the object. With this, a control task for controlling an object in real time and a non-control task can be executed such that the real-time control of the object can be ensured.

Preferably, the high priority PH indicates a priority that is greater than or equal to the priority of another task (low priority control task 142, for example), and the low priority PL indicates a priority that is less than or equal to the priority of the other task. With this, another task can be preferentially executed, and when the other task provides data relating to real-time control such as trajectory data to the control task, the real-time control of an object can be reliably performed.

Preferably, the first time period T1 is variably set. Also, the low priority PL and the high priority PH may be variably set. Therefore, the first time period T1 and the high priority PH or the low priority PL can be determined by performing adjustment such that the control task for controlling an object in real time and the non-control task can be executed so as to ensure real-time control of the object.

Preferably, with respect to the non-control task having the low priority PL, the priority switching part 153 further increases the priority of the non-control task to the high priority PH, when the execution time exceeds a second time period T2. Therefore, the execution time of the non-control task can be adjusted, using the first time period T1 and the second time period T2 as a guide, such that the real-time control of an object can be ensured.

Preferably, the second time period T2 is variably set. Therefore, the second time period T2 can be determined by performing adjustment such that the control task for controlling an object in real time and the non-control task can be executed so as to ensure real-time control of the object.

Preferably, the related processing includes feature amount generation processing for generating a feature amount that is suitable for detecting an anomaly occurring in an object from data related to the object, anomaly detection processing for detecting an anomaly using the feature amount generated by the feature amount generation processing, and processing for communicating data for the feature amount generation processing or the anomaly detection processing with a device including a storage device.

Therefore, the real-time control of an object can be performed using an anomaly detection result, which is a result of real time execution of the non-control task.

Preferably, the related processing includes calculation processing for calculating an estimated control amount 1513 of an object 90 using an instruction value 1512 that is output from a control device to the object and a predetermined predictive control model 1434, and correction value calculation processing 1431 for calculating a correction value 1514 based on a control amount calculated in the calculation processing, and the control task 141 includes a control computation task 1411 for calculating a control output (instruction value 1516) to the object in accordance with the calculated correction value 1514.

Therefore, the real-time control of an object can be performed using a result of processing in which the predictive control model of the non-control task is used.

Preferably, the related processing includes calculation processing for calculating the estimated control amount 1513 of the object using a control amount 1517, of the object 90, that is output from the control device to the object and the predetermined predictive control model 1434, and the correction value calculation processing 1431 for calculating the correction value 1514 based on the control amount 1513 calculated in the calculation processing, and the control task 141 includes the control computation task 1411 for calculating the control output (instruction value 1516) to the object in accordance with the calculated correction value.

Therefore, the real-time control of an object can be performed using a result of processing in which the predictive control model of the non-control task is used.

Preferably, the correction value calculation processing includes processing for calculating a correction value by performing correction such that the control amount is in a predetermined range.

Therefore, the correction value can be calculated by performing correction such that the control amount is in the predetermined range.

Preferably, the control device includes a collection part 155 that collects, with respect to the non-control task, information regarding execution of the non-control task including an execution time, and the information collected by the collection part is output to the outside.

Therefore, as a result of outputting the collected information, information including the execution time of the non-control task can be provided to a user as support information for setting the first time period T1 or the second time period T2.

Preferably, the information to be collected includes the number of switching of the priority of the non-control task.

Therefore, the number of switching of the priority of the non-control task can be provided to the user as the support information.

Preferably, contents of processing included in the related processing are variably set.

Therefore, the contents of the related processing (type of the related processing program, contents of processing such as computation processing) can be adjusted such that the control task for controlling an object in real time and the non-control task can ensure the real-time control of the object.

Preferably, a processor 102 includes a plurality of processor cores (Core1 to Core4), and core information 136 is stored for designating a processor core that will execute the non-control task. A scheduler 151 includes a core switching part 156 for determining the processor core that will execute the non-control task based on the core information 136 or a usage rate 159 of each processor core.

Therefore, the processor core having the usage rate 159 indicating that an empty ratio E is high is determined, and the processor core can be caused to execute the non-control task.

Preferably, the core information 136 includes information for designating a processor core that will execute the non-control task based on the priority of the non-control task.

Therefore, when there are a plurality of non-control tasks, it is possible that the processor cores are determined in the descending order of the priorities of the non-control tasks, and the non-control tasks are executed by the respective determined processor cores.

The embodiments disclosed herein are considered in all respects to be illustrative and not restrictive. The scope of the invention is indicated by the claims rather than by the foregoing description, and all changes that come within the meaning and range of equivalency of the claims are intended to be encompassed therein.

INDEX TO THE REFERENCE NUMERALS

1 Control system
10 Field device group
100 Control device
101 Timer
102, 202 Processor
106, 206 Main storage device
108, 208 Secondary storage device
131 Task control information
133 Priority
134 Program name
135 Log
136 Core information
137 Operating core designation
138 Assignment mode
141 High priority control task
142 Low priority control task
143 Related processing task
144 Service task
150 User program
151 Scheduler
152 Setting part
152A Threshold value
152B Priority information
153 Priority switching part
153A Monitor information
153B Counter
154 Task information setting part
155 Collection part 156 Core switching part
157 Execution instruction part
158 Core designation command
159 Usage rate
161 Control input program
162 Control output program
163 High priority control program
164 Low priority control program
165 Related processing program
166 System service program
191 Multitask execution part
200 Support device
204 Optical drive
205 Recording medium
216 Input unit
218 Display unit
222 Development program
224 Parameter setting tool
226 Data mining tool
227 Debugging tool
228 Collected information
300 Data logging device
400 Display device
E Empty ratio
FL Status flag
PH High priority
PL Low priority
PR Management processing
RTS, RTS1, RTS2, RTS3 Task
T Cycle
t Execution time

The invention claimed is:

1. A control device for controlling an object, the control device comprising:
a processor configured to execute a plurality of tasks comprising a control task for performing real-time control of the object and a non-control task for performing related processing related to the real-time control;
a multitask execution part configured to cause the processor to execute the plurality of tasks in a sequence based on priorities associated with respective tasks of the plurality of tasks; and
a scheduler configured to variably set the priority of the non-control task, wherein
the control task is set to have a highest priority, and
the scheduler comprises a priority switching part configured to set the priority of the non-control task to a first priority in response to an execution start condition of the non-control task having been satisfied, to keep the priority of the non-control task at the first priority while a period of time from an execution start of the non-control task is less than or equal to a first time period for executing the related processing in real time, and thereafter to reduce the priority of the non-control task to a second priority in response to the period of time from the execution start having exceeded the first time period.

2. The control device according to claim 1, wherein the first time period is variably set.

3. The control device according to claim 1, wherein the priority switching part further performs switching such that, in response to the period of time from the execution start of the non-control task, which has the second priority, exceeding a second time period, the priority of the non-control task increases to the first priority.

4. The control device according to claim 3, wherein the second time period is variably set.

5. The control device according to claim 1, wherein the related processing comprises:
feature amount generation processing for generating a feature amount that is suitable for detecting an anomaly occurring in the object from data related to the object;
anomaly detection processing for detecting the anomaly using a feature amount generated in the feature amount generation processing; and
processing for communicating data for the feature amount generation processing or the anomaly detection processing to a device comprising a storage device.

6. The control device according to claim 1, wherein the related processing comprises:
calculation processing for calculating an estimated control amount of the object using an instruction value that is output from the control device to the object and a predetermined predictive control model; and
correction value calculation processing for calculating a correction value based on a control amount calculated in the calculation processing, and
the control task comprises a control computation task for calculating an instruction value to the object in accordance with the calculated correction value.

7. The control device according to claim 1, wherein the related processing comprises:
calculation processing for calculating an estimated control amount of the object using a control amount, of the object, that is output from the control device to the object, and a predetermined predictive control model; and
correction value calculation processing for calculating a correction value based on a control amount calculated in the calculation processing, and
the control task comprises a control computation task for calculating an instruction value to the object in accordance with the calculated correction value.

8. The control device according to claim 6, wherein the correction value calculation processing comprises processing for calculating the correction value that has been corrected such that the control amount is in a predetermined range.

9. The control device according to claim 1, further comprising a collection part configured to collect, with respect to the non-control task, information regarding execution of the non-control task comprising the period of time from the execution start, wherein
the information collected by the collection part is output to the outside.

10. The control device according to claim 9, wherein the information to be collected comprises the number of switching of the priority of the non-control task.

11. The control device according to claim 1, wherein pieces of processing included in the related processing is set variable.

12. The control device according to claim 1, wherein the processor comprises a plurality of processor cores,
the control device further comprising a core information storage part for storing core information for designating a processor core for executing the non-control task, and
the scheduler further comprising a core switching part configured to determine the processor core for executing the non-control task based on the core information or usage rates of respective processor cores.

13. The control device according to claim 12, wherein the core information comprises information for designating a processor core that will execute the non-control task based on the priority of the non-control task.

14. The control device according to claim 2, wherein the priority switching part further performs switching such that, in response to the period of time from the execution start of the non-control task, which has the second priority, exceeding a second time period, the priority of the non-control task increases to the first priority.

15. The control device according to claim 14, wherein the second time period is variably set.

16. The control device according to claim 2, wherein the related processing comprises:
   feature amount generation processing for generating a feature amount that is suitable for detecting an anomaly occurring in the object from data related to the object;
   anomaly detection processing for detecting the anomaly using a feature amount generated in the feature amount generation processing; and
   processing for communicating data for the feature amount generation processing or the anomaly detection processing to a device comprising a storage device.

17. The control device according to claim 2, wherein the related processing comprises:
   calculation processing for calculating an estimated control amount of the object using an instruction value that is output from the control device to the object and a predetermined predictive control model; and
   correction value calculation processing for calculating a correction value based on a control amount calculated in the calculation processing, and
   the control task comprises a control computation task for calculating an instruction value to the object in accordance with the calculated correction value.

18. The control device according to claim 2, wherein the related processing comprises:
   calculation processing for calculating an estimated control amount of the object using a control amount, of the object, that is output from the control device to the object, and a predetermined predictive control model; and
   correction value calculation processing for calculating a correction value based on a control amount calculated in the calculation processing, and
   the control task comprises a control computation task for calculating an instruction value to the object in accordance with the calculated correction value.

19. A control method of a control device for controlling an object, wherein the control device comprises: a processor configured to execute a plurality of tasks comprising a control task for performing real-time control of the object and a non-control task for performing related processing related to the real-time control; and a multitask execution part configured to cause the processor to execute the plurality of tasks in a sequence based on priorities associated with the respective plurality of tasks, and the control task is set to have a highest priority, the control method comprising:
   variably setting the priority of the non-control task, wherein
   the variably setting comprises:
      setting the priority of the non-control task to a first priority in response to an execution start condition of the non-control task being satisfied, and keeping the priority of the non-control task at the first priority while a period of time from an execution start of the non-control task is less than or equal to a first time period for executing the related processing in real time; and
      thereafter performing switching such that the priority of the non-control task decreases to a second priority, in response to the period of time from the execution start having exceeded the first time period.

20. A non-transitory computer-readable storage medium storing a program, which when read and executed, causes a computer to perform operations comprising operations to execute the control method according to claim 19.

* * * * *